United States Patent
Mucke et al.

(10) Patent No.: US 9,119,211 B2
(45) Date of Patent: Aug. 25, 2015

(54) RF CHAIN MANAGEMENT IN A CARRIER AGGREGATION CAPABLE WIRELESS COMMUNICATION DEVICE

(71) Applicant: Apple Inc., Cupertino, CA (US)

(72) Inventors: Christian W. Mucke, Sunnyvale, CA (US); Tarik Tabet, Los Gatos, CA (US); Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/911,826

(22) Filed: Jun. 6, 2013

(65) Prior Publication Data

US 2013/0331077 A1    Dec. 12, 2013

Related U.S. Application Data

(60) Provisional application No. 61/657,783, filed on Jun. 9, 2012, provisional application No. 61/681,126, filed on Aug. 8, 2012.

(30) Foreign Application Priority Data

Jun. 4, 2013   (WO) .................. PCT/US2013/04409

(51) Int. Cl.
    *H04W 76/06*      (2009.01)
    *H04W 76/02*      (2009.01)
    *H04L 5/00*       (2006.01)

(52) U.S. Cl.
CPC ............ *H04W 76/06* (2013.01); *H04W 76/064* (2013.01); *H04L 5/0098* (2013.01); *H04W 76/025* (2013.01)

(58) Field of Classification Search
CPC .... H04W 76/06; H04W 76/064; H04W 24/10
See application file for complete search history.

(56) References Cited

U.S. PATENT DOCUMENTS

2009/0270103 A1   10/2009   Pani et al.
2011/0134774 A1   6/2011   Pelletier
(Continued)

FOREIGN PATENT DOCUMENTS

| KR | 20110108773 | 10/2011 |
|---|---|---|
| KR | 20120030919 | 3/2012 |
| WO | 2012039541 | 3/2012 |

OTHER PUBLICATIONS

Patent Examination Report No. 1, Australian Patent Application No. 2012202551, Australian Government, IP Australia, Sep. 30, 2013, 4 pp.

(Continued)

*Primary Examiner* — Mehmood B Khan
(74) *Attorney, Agent, or Firm* — Downey Brand LLP

(57) ABSTRACT

A method for managing radio frequency (RF) chains in a carrier aggregation capable wireless communication device is provided. The method can include a wireless communication device using a first RF chain associated with a first component carrier and a second RF chain associated with a second component carrier to support a connection to a network. The method can further include the wireless communication device formatting a deactivation message configured to trigger deactivation of the second component carrier. The method can additionally include the wireless communication device sending the deactivation message to the network to trigger deactivation of the second component carrier. The method can also include the wireless communication device discontinuing usage of the second RF chain to support the connection to the network via the second component carrier after sending the deactivation message.

21 Claims, 14 Drawing Sheets

(56) References Cited

U.S. PATENT DOCUMENTS

| | | | |
|---|---|---|---|
| 2011/0199908 A1 | 8/2011 | Dalsgaard et al. | |
| 2011/0274007 A1 | 11/2011 | Lin et al. | |
| 2012/0058797 A1 | 3/2012 | Gaal | |
| 2012/0230268 A1* | 9/2012 | Marinier et al. | 370/329 |
| 2012/0236776 A1* | 9/2012 | Zhang et al. | 370/312 |
| 2012/0281566 A1* | 11/2012 | Pelletier et al. | 370/252 |
| 2013/0010611 A1 | 1/2013 | Wiemann | |
| 2013/0016690 A1* | 1/2013 | Jeong et al. | 370/329 |
| 2013/0039342 A1 | 2/2013 | Kazmi | |
| 2013/0044662 A1 | 2/2013 | Kwon | |
| 2013/0070685 A1* | 3/2013 | Yi et al. | 370/328 |
| 2013/0070716 A1* | 3/2013 | Kwon et al. | 370/329 |
| 2013/0090146 A1 | 4/2013 | Kwon | |
| 2013/0107743 A1* | 5/2013 | Ishii et al. | 370/252 |
| 2013/0136015 A1* | 5/2013 | Ojala et al. | 370/252 |
| 2013/0201834 A1* | 8/2013 | Klingenbrunn et al. | 370/236 |
| 2014/0016555 A1* | 1/2014 | Zhao et al. | 370/328 |

OTHER PUBLICATIONS

International Search Report and Written Opinion for PCT Application No. PCT/US2013/044097, dated Sep. 16, 2013.

"Separate SCell (De) Activation with LTE CA", 3GPP TSG-RAN WG2 #70bis, Tdoc R2-103773, InterDigital, Stockholm, Sweden, Jun. 28-Jul. 2, 2010, 4pp.

Taiwanese Patent Application No. 102120411—Office Action dated Nov. 19, 2014.

* cited by examiner

RF CHAIN MANAGEMENT IN A CARRIER AGGREGATION CAPABLE WIRELESS COMMUNICATION DEVICE

CROSS REFERENCE TO RELATED APPLICATIONS

This application claims priority to PCT Application No. PCT/US2013/044097, filed on Jun. 4, 2013. This application claims the benefit of U.S. Provisional Patent Application No. 61/657,783, filed on Jun. 9, 2012 and the benefit of U.S. Provisional Patent Application No. 61/681,126, filed on Aug. 8, 2012, both of which are incorporated herein by reference in their entirety.

FIELD OF THE DESCRIBED EMBODIMENTS

The described embodiments relate generally to wireless communications and more particularly to radio frequency (RF) chain management in a carrier aggregation capable wireless communication device.

BACKGROUND

Modern wireless communication devices continue to evolve to offer an ever increasing array of capabilities, and are now virtually ubiquitously used by consumers to access a variety of data intensive services via wireless networks. The resulting increased demand on networks to support data intensive services for a rapidly increasing number of devices has placed a demand on network operators to offer upgraded networks capable of supporting both increased data capacity and faster data rates. As such, efforts continue to be made to develop advanced radio access technologies (RATs) to provide higher throughput for data transmitted via wireless networks to support the demand for data services from modern wireless communication devices. For example, some modern cellular RATs, such as Long Term Evolution (LTE) Release 10 and beyond, also referred to as LTE-Advanced (LTE-A), support a technique known as carrier aggregation, in which bandwidth can be extended through the aggregation of multiple component carriers (CC). In this regard, rather than using a single carrier to support communication between a device and the network, carrier aggregation uses multiple CCs in parallel such that bandwidth for data transmissions to and/or from a wireless communication device can be increased through the aggregation of multiple CCs for conveying data transmissions.

In LTE-A systems, each CC is backward compatible with the LTE Release 8 carrier structure. Carrier aggregation can be supported through the use of both contiguous and non-contiguous spectrums. In this regard, CCs used for carrier aggregation can utilize adjacent frequency bands, or can utilize non-adjacent frequency bands.

SUMMARY OF THE DESCRIBED EMBODIMENTS

Some example embodiments disclosed herein provide for RF chain management in a carrier aggregation capable wireless communication device. In this regard, some example embodiments provide a wireless communication device configured to signal a carrier aggregation capable network, also referred to as a multiple component carrier capable (MCC) network, to trigger deactivation and/or activation of a secondary component carrier. As such, rather than relying on the network to initiate activation/deactivation of component carriers as in prior systems, a wireless communication device in accordance with some example embodiments can have more autonomous control over its use of radio resources. As such, a wireless communication device in accordance with some example embodiments can initiate activation/deactivation of component carriers to adapt to changing operating conditions that can be experienced by the device, such as in response to changing bandwidth needs at the device, to reduce power consumption at the device, and/or for other reasons. Further, some example embodiments provide a wireless communication device that can be configured to initiate deactivation of a secondary component carrier associated with an RF chain to free the RF chain to be repurposed for a function other than supporting carrier aggregation on a secondary component carrier.

This Summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. Other embodiments, aspects, and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
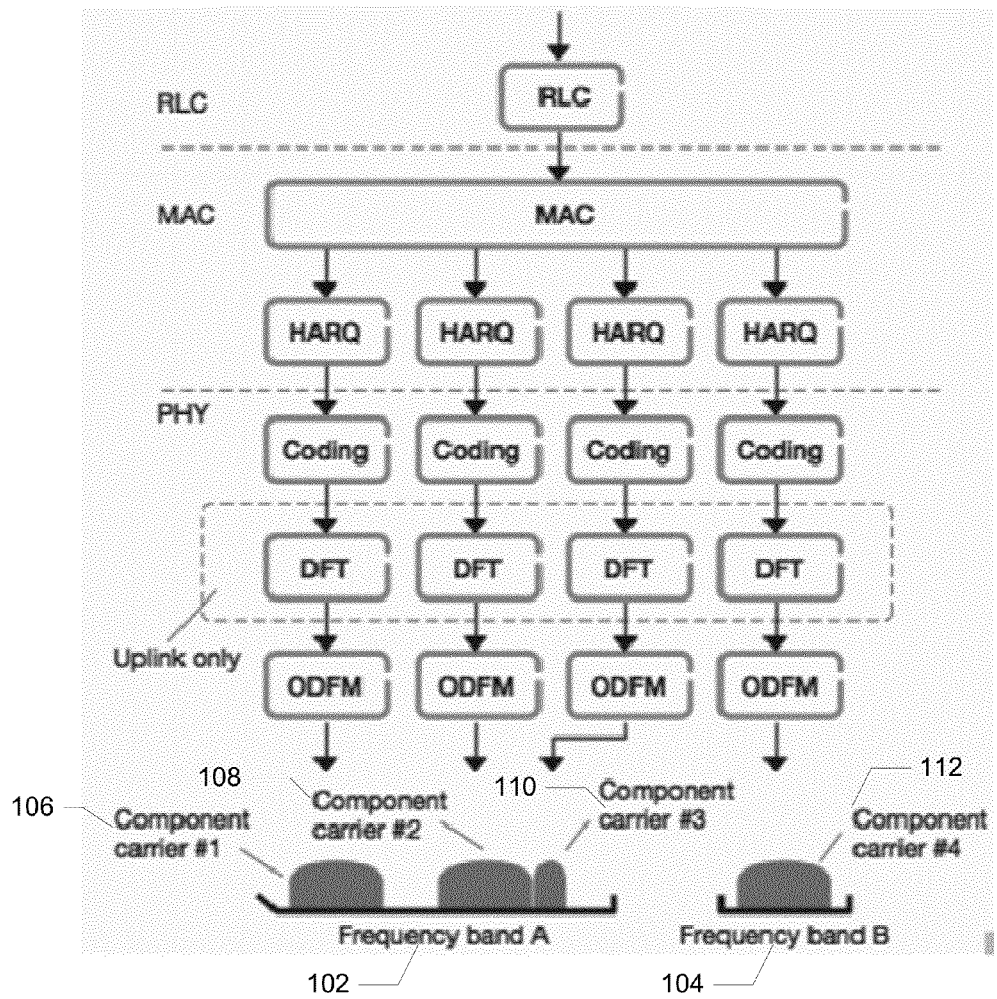
FIG. 1 illustrates an example of carrier aggregation in accordance with some example embodiments.

As previously discussed, some modern RATs, such as LTE-A, and modern wireless communication devices configured to operate over such RATs support carrier aggregation techniques in which communication between a device and a network can be conveyed over multiple component carriers so as to increase available bandwidth for communication between the device and the network. FIG. 1 illustrates an example of carrier aggregation in accordance with some example embodiments. The example of FIG. 1 can support communication via component carriers within frequency band A 102 and frequency band B 104. In this regard, component carrier #1 106, component carrier #2 108, and component carrier #3 110 are within frequency band A 102, while component carrier #4 112 is within frequency band B 104. As such, depending on the combination of component carriers that are used in a given carrier aggregation configuration, carrier aggregation can make use of intra-band aggregation and/or inter-band aggregation. For example, intra-band carrier aggregation can use contiguous component carriers #2 108 and #3 110. Additionally or alternatively, intra-band carrier aggregation can occur on non-contiguous component carriers #1 106 and #3 110. As a further example, inter-band carrier aggregation can use component carrier #1 106 (and/or one or more of #2 108 and #3 110) in frequency band A 102 and component carrier #4 112 in frequency band B 104.

A wireless communication device capable of using carrier aggregation implements multiple radio frequency (RF) chains, or radio resources, to support carrier aggregation. In this regard, when carrier aggregation is activated on a device, the wireless communication device can use a separate RF chain for each component carrier allocated to the device. Each active component carrier used by a wireless communication device can accordingly be associated with a respective RF chain on the device.

Carrier aggregation has previously been activated and deactivated only through network-initiated media access control (MAC) signaling. For example, in existing systems, carrier aggregation can be deactivated by the network when additional bandwidth is not needed to support active data services in order to save battery at the wireless communication device, as the concurrent usage of multiple RF chains can increase device power consumption. However, network-initiated activation/deactivation of component carriers does not afforded wireless communication devices with sufficient autonomy to quickly respond to changing conditions that may be experienced by the wireless communication device. In this regard, in present systems, a wireless communication device cannot signal the network to activate/deactivate a component carrier, having to instead wait for the network to initiate activation/deactivation of the component carrier, which may not occur until a substantial period of time has passed after occurrence of a condition for which it may be desirable to activate/deactivate a component carrier. Some example embodiments address this problem by providing a wireless communication device with a fast mechanism to trigger activation/deactivation of a component carrier. Some example embodiments further provide a wireless communication device that can be configured to repurpose an RF chain that can be made available by deactivation of a component carrier for a function other than communication via a component carrier.

Figure 2:
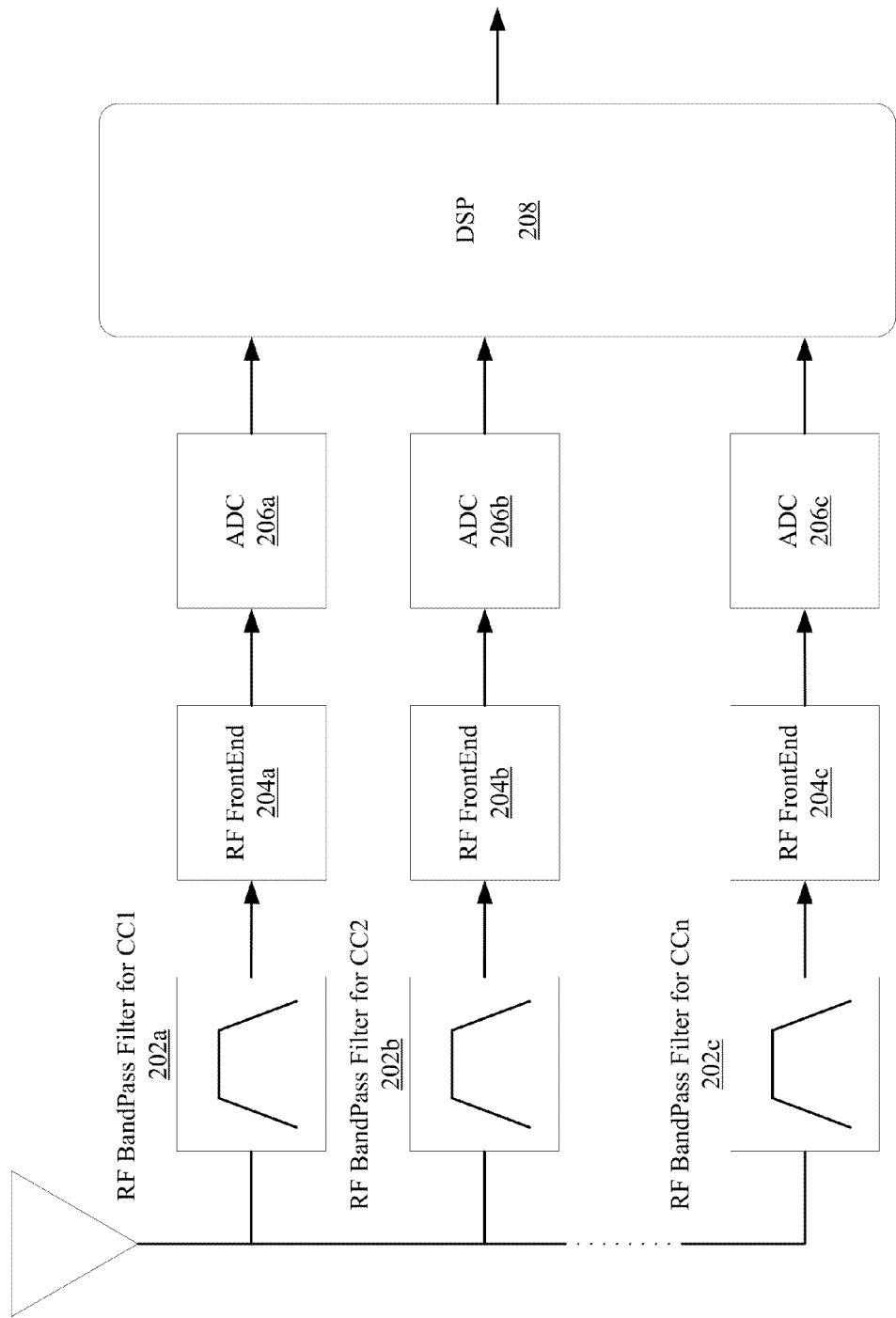
FIG. 2 illustrates an example transceiver architecture in accordance with some example embodiments.

FIG. 2 illustrates an example transceiver architecture that can be implemented on a carrier aggregation capable wireless communication device in accordance with some example embodiments. As illustrated in FIG. 2, a transceiver on a carrier aggregation capable wireless communication device can include a plurality of RF chains, which can be used to support respective component carriers (CCs). For example, a first RF chain can be used for CC1, a second RF chain can be used for CC2 . . . and an $n^{th}$ RF chain can be used for CCn. In this regard, a transceiver architecture in accordance with some example embodiments can include at least a number of RF chains corresponding to a number of CCs that can be aggregated in accordance with device and/or network specifications. For example, some LTE-A systems support aggregation of up to 5 CCs, and a transceiver configuration on a device configured to operate on such LTE-A systems can include at least 5 RF chains to support the use of 5 CCs. It will be appreciated, however, that a carrier aggregation capable wireless communication device in accordance with various example embodiments can include any number, n, RF chains, where n is at least two.

In the example architecture illustrated in FIG. 2, each RF chain can include an RF band pass filter 202, an RF front end 204, and an analog-to-digital converter (ADC) 206. In this regard, the first RF chain can include the RF band pass filter 202a, RF front end 204a, and ADC 206a; the second RF chain can include the RF band pass filter 202b, RF front end 204b, and ADC 206b; and the nth RF chain can include the RF band pass filter 202c, RF front end 204c, and ADC 206c. It will be appreciated, however, that the RF chain architecture illustrated in FIG. 2 is illustrated by way of example, and not by way of limitation. In this regard, an RF chain in accordance with various example embodiments can include additional and/or alternative elements to those illustrated in FIG. 2. In the example architecture of FIG. 1, each RF chain can feed into a digital signal processor (DSP) 208.

Figure 3:
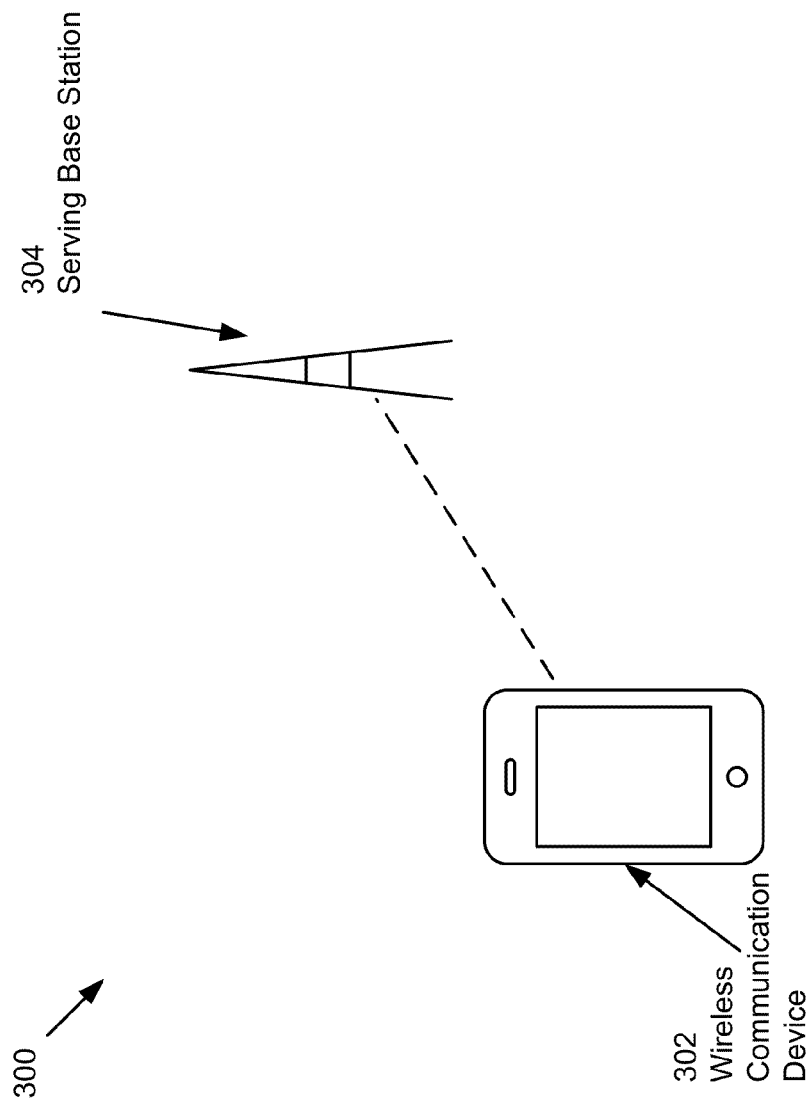
FIG. 3 illustrates a wireless communication system in accordance with some example embodiments.

FIG. 3 illustrates a wireless communication system 300 in which some example embodiments can be applied. In this regard, FIG. 3 illustrates a wireless cellular access network including a wireless communication device 302 and a serving base station 304, which can provide network access to the wireless communication device 302 via one or more radio links. By way of non-limiting example, the wireless communication device 302 can be a cellular phone, such as a smart phone device, a tablet computing device, a laptop computing device, or other computing device configured to access a cellular and/or other wireless network via a serving base station 304. In some embodiments, such as embodiments in which the system 300 implements an LTE technology, the wireless communication device 302 can be a user equipment (UE) device. The serving base station 304 can be any cellular base station, such as an evolved node B (eNB), node B, base transceiver station (BTS), and/or any other type of base station.

The wireless access network of the system 300 can be a carrier aggregation capable network implementing any RAT that can support carrier aggregation techniques, including, by way of non-limiting example, an LTE RAT, such as LTE, LTE-Advanced (LTE-A), and/or other carrier aggregation capable LTE RAT (e.g., a LTE Release 10 or later LTE RAT). It will be appreciated, however, that the embodiments disclosed herein are not limited to application within LTE systems, and can be applied to any present or future-developed RAT supporting carrier aggregation. Further, it will be appreciated that some example embodiments can be applied to non-cellular wireless RATs in which carrier aggregation techniques can be implemented. Thus, for example, it will be appreciated that a wireless network access point in accordance with any such RAT can be substituted for the serving base station 304 within the scope of the disclosure. Further, it will be appreciated that where various embodiments are discussed by way of example as being applied to LTE and/or other cellular RAT, such examples are provided as non-limiting examples of the applications of some example embodiments and the techniques can be applied to another RAT using carrier aggregation techniques within the scope of the disclosure.

The wireless communication device 302 can include a plurality of RF chains to support carrier aggregation. In this regard, the wireless communication device 302 can, for example, include a transceiver architecture, such as that illustrated in FIG. 2. When carrier aggregation is activated on the wireless communication device 302, the wireless communication device 302 can use multiple RF chains concurrently to support aggregation of multiple component carriers. Each component carrier can correspond to a separate serving cell. In some instances, each component carrier that can be used by the wireless communication device 302 can be supported by the serving base station 304. In this regard, the serving base station 304 can, in some example embodiments, support multiple co-located cells. However, in some instances, one or more component carriers that can be used by the wireless communication device 302 can be supported by one or more further base stations that can be disposed within the wireless access network of the system 300.

The radio resource control (RRC) connection for the wireless communication device 302 can be handled by a primary serving cell, which can be served by a primary component carrier. The RF chain on the wireless communication device 302 that can be dedicated to the primary component carrier can be referred to as a primary RF chain. The further component carrier(s) used by the wireless communication device 302 when carrier aggregation is activated can be referred to as secondary component carriers, and the RF chain(s) on the wireless communication device 302 that can be dedicated to the active secondary component carrier(s) can be referred to as secondary RF chains.

Figure 4:
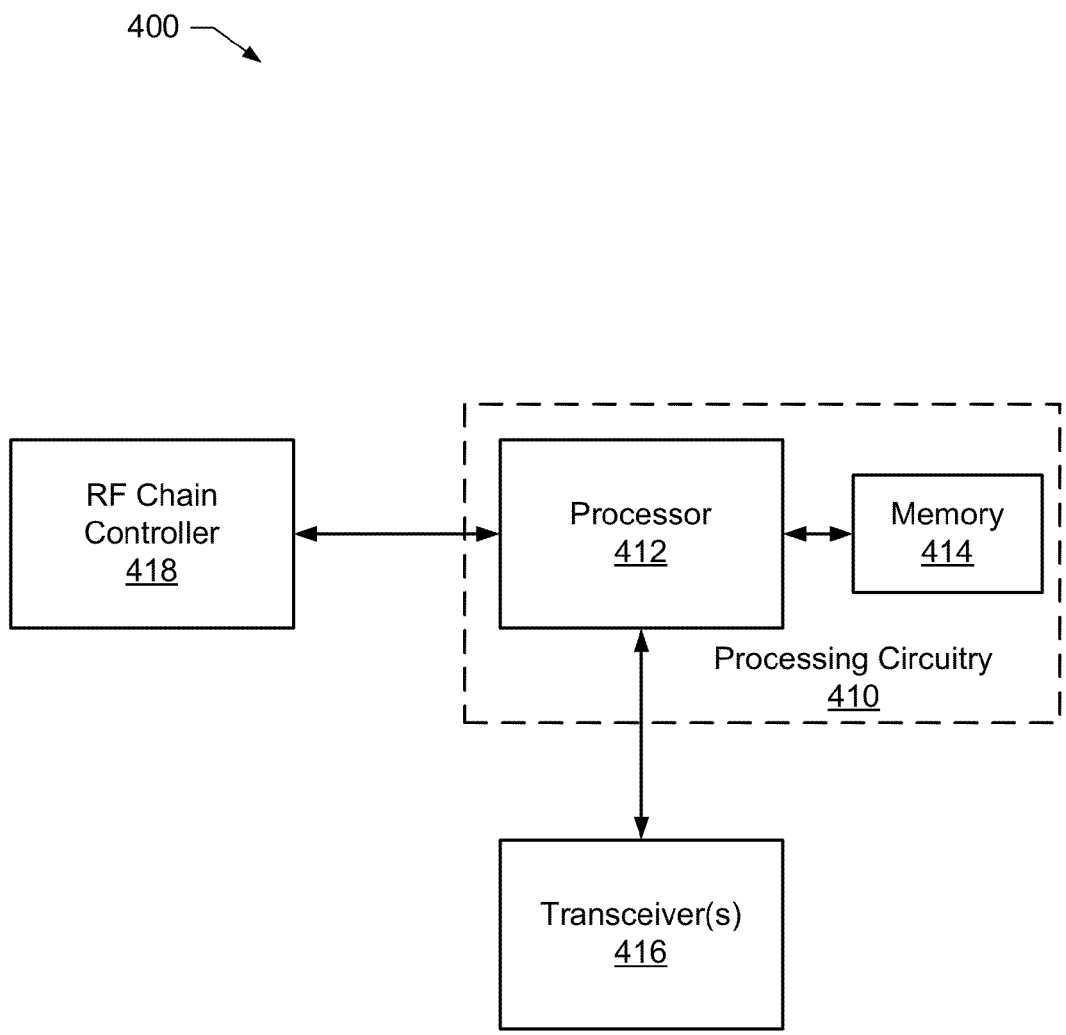
FIG. 4 illustrates a block diagram of an apparatus that can be implemented on a wireless communication device in accordance with some example embodiments.

FIG. 4 illustrates a block diagram of an apparatus 400 that can be implemented on a wireless communication device 302, in accordance with some example embodiments. In this regard, when implemented on a computing device, such as wireless communication device 302, apparatus 400 can enable the computing device to operate within the system 300 in accordance with one or more example embodiments. It will be appreciated that the components, devices or elements illustrated in and described with respect to FIG. 4 below may not be mandatory and thus some may be omitted in certain embodiments. Additionally, some embodiments can include further or different components, devices or elements beyond those illustrated in and described with respect to FIG. 4.

In some example embodiments, the apparatus 400 can include processing circuitry 410 that is configurable to perform actions in accordance with one or more example embodiments disclosed herein. In this regard, the processing circuitry 410 can be configured to perform and/or control performance of one or more functionalities of the apparatus 400 in accordance with various example embodiments, and thus can provide means for performing functionalities of the apparatus 400 in accordance with various example embodiments. The processing circuitry 410 can be configured to perform data processing, application execution and/or other processing and management services according to one or more example embodiments.

In some embodiments, the apparatus 400 or a portion(s) or component(s) thereof, such as the processing circuitry 410, can include one or more chipsets, which can each include one or more chips. The processing circuitry 410 and/or one or more further components of the apparatus 400 can therefore, in some instances, be configured to implement an embodiment on a chipset. In some example embodiments in which one or more components of the apparatus 400 are embodied as a chipset, the chipset can be capable of enabling a computing device to operate in the system 300 when implemented on or otherwise operably coupled to the computing device. In some example embodiments, the apparatus 400 can include a cellular chipset, which can be configured to enable a computing device, such as wireless communication device 302, to operate on one or more cellular networks.

In some example embodiments, the processing circuitry 410 can include a processor 412 and, in some embodiments, such as that illustrated in FIG. 3, can further include memory 414. The processing circuitry 410 can be in communication with or otherwise control the transceiver(s) 416 and/or RF chain controller 418.

The processor 412 can be embodied in a variety of forms. For example, the processor 412 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 412 can comprise a plurality of processors. The plurality of processors can be in operative communication with each other and can be collectively configured to perform one or more functionalities of the apparatus 400 as described herein. In some example embodiments, the processor 412 can be configured to execute instructions that can be stored in the memory 414 or that can be otherwise accessible to the processor 412. As such, whether configured by hardware or by a combination of hardware and software, the processor 412 capable of performing operations according to various embodiments while configured accordingly.

In some example embodiments, the memory 414 can include one or more memory devices. Memory 414 can include fixed and/or removable memory devices. In some embodiments, the memory 414 can provide a non-transitory computer-readable storage medium that can store computer program instructions that can be executed by the processor 412. In this regard, the memory 414 can be configured to store information, data, applications, instructions and/or the like for enabling the apparatus 400 to carry out various functions in accordance with one or more example embodiments. In some embodiments, the memory 414 can be in communication with one or more of the processor 412, transceiver(s) 416, or RF chain controller 418 via a bus(es) for passing information among components of the apparatus 400.

The apparatus 400 can further include one or more transceivers 416. The transceiver(s) 416 can enable the apparatus 400 to send wireless signals to and receive signals from one or more wireless networks. Thus, for example, when implemented on wireless communication device 302, the transceiver(s) 416 can be configured to support a connection to one or more base stations, such as serving base station 304, via one or more component carriers. The transceiver(s) 416 can include two or more RF chains to support carrier aggregation. In some example embodiments, the transceiver(s) 416 can be at least partially implemented via an architecture such as that illustrated in FIG. 2. In some example embodiments, the RF chains can be implemented on a single chip. Alternatively, in some example embodiments, the RF chains can be distributed across a plurality of chips that can be in operative communication with each other, and which can collectively provide functionality of the transceiver(s) 416. The transceiver(s) 416 can include any number, n, RF chains, where n is at least two. The number of RF chains included in the transceiver(s) 416 in some example embodiments can correspond to a number of component carriers that the apparatus 400 and/or serving network can be configured to support for aggregation. However, it will be appreciated that in some example embodiments, the apparatus 400 can include additional or fewer RF chains than a corresponding number of component carriers that can be aggregated in accordance with capabilities of a serving network.

The apparatus 400 can further include RF chain controller 418. The RF chain controller 418 can be embodied as various means, such as circuitry, hardware, a computer program product comprising computer readable program instructions stored on a computer readable medium (for example, the memory 414) and executed by a processing device (for example, the processor 412), or some combination thereof. In some embodiments, the processor 412 (or the processing circuitry 410) can include, or otherwise control the RF chain controller 418. The RF chain controller 418 can be configured to communicate with a serving network to trigger activation/deactivation of a component carrier associated with an RF chain and control operation of RF chains implemented by the transceiver(s) 416, as described further herein below.

Device Triggered Component Carrier Activation/Deactivation

The RF chain controller 418 of some example embodiments can be configured to format and send messages to a serving network, such as to the serving base station 304 to trigger activation/deactivation of a component carrier(s). The serving network can be configured to respond to such messages by activating/deactivating a component carrier(s) indicated in a message received from a wireless communication device.

In this regard, some example embodiments provide for device-initiated activation/deactivation of a component carrier such that the wireless communication device of some example embodiments does not have to wait to receive network-initiated signaling for activating/deactivating a component carrier. The RF chain controller 418 can accordingly respond to changing conditions experienced by the wireless communication device to trigger activation/deactivation of a component carrier(s) as conditions merit. Thus, for example, the RF chain controller 418 can send a carrier activation request message to trigger activation of a component carrier in an instance in which bandwidth needs of the wireless communication device merit activation of an additional component carrier. As a further example, the RF chain controller 419 can send a deactivation message to the network trigger deactivation of a component carrier in an instance in which bandwidth needs of the device do not support a need for a secondary component carrier to be activated, to conserve power at the device by deactivating an RF chain, to free an RF chain to be repurposed for a function other than carrier aggregation, and/or as conditions experienced by the device otherwise merit.

A deactivation message that can be formatted and sent by the RF chain controller 418 can have any format that can be understood by the network. The deactivation message of some example embodiments can include an indication of a component carrier to be deactivated. In some example embodiments, the deactivation message can be a media access control (MAC) control element (CE) including a carrier deactivation indication for a particular component carrier(s). It will be appreciated, however, that other types of messages and other signaling layers that can be used for communication between a wireless communication device and serving network are contemplated within the scope of the disclosure.

In some embodiments in which the deactivation message is a MAC CE, the deactivation notification MAC Control Element CE can be identified by a MAC protocol data unit (PDU). As a non-limiting example, in an LTE-A network, MAC PDU sub-header with a reserved logical channel ID (LCID) could be used as specified below:

| Index | LCID values |
| --- | --- |
| 00000 | CCCH |
| 00001-01010 | Identity of the logical channel |
| 01011-11000 | Reserved |
| 10110 | Deactivation Notification |
| 10111 | Activation Request |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

The MAC CE can have a fixed size and can, for example, consist of a single octet containing seven-bit C-field and one-bit R-field. The control element can be defined as follows. $C_i$: if there is a secondary cell (SCell) (or secondary Carrier Component CC) configured with SCellIndex i, this field can be used to indicate the deactivation notification of the SCell with SCellIndex i. The Ci field can be set to "1" to notify that the SCell with SCellIndex i will be deactivated. In such embodiments, a $C_i$ field set to "0" can be ignored by the network. R: Reserved bit, can be set to "0". After sending the deactivation MAC CE, the RF chain controller 418 can be configured to deactivate the SCell within k subframes. The value of k can, for example, be 8 subframes. However, it will be appreciated that other values of k can be used.

The deactivation message of some example embodiments can be a deactivation request message requesting that the network deactivate a component carrier. In such example embodiments, the RF chain controller 418 may wait for a deactivation permission response before discontinuing usage of an RF chain associated with a secondary component carrier for which deactivation is requested for carrier aggregation. If the network does not grant the request to deactivate the component carrier, the RF chain controller 418 can continue to use the RF chain associated with the component carrier to support the network connection via the component carrier. In such example embodiments, while deactivation of a component carrier can be initiated by a wireless communication device, control over whether a component carrier is deactivated can remain with the network, as the network can decide whether to grant or deny the request to deactivate a component carrier.

The deactivation message of some example embodiments can instead be a deactivation notification message. In such example embodiments, the network can be configured to respond to the deactivation notification message by discontinuing usage of a component carrier identified in the deactivation notification message for communication with the wireless communication device. In such example embodiments, the wireless communication device can have more autonomy over deactivation of a component carrier, as the wireless communication device of such example embodiments does not have to rely on network permission for deactivation of a component carrier. In some such example embodiments, the RF chain controller 418 can discontinue usage of the RF chain associated with the component carrier being deactivated for carrier aggregation after sending the message without waiting for an acknowledgement (ACK) from the network that the deactivation notification message has been received by the network. Alternatively, in some such example embodiments, the RF chain controller 418 can wait to receive an ACK from the network acknowledging receipt of the deactivation notification message before discontinuing usage of the RF chain to support the connection to the network via the component carrier being deactivated.

A carrier activation request message that can be formatted and sent by the RF chain controller 418 can have any format that can be understood by the network. The carrier activation request message of some example embodiments can include an indication of a component carrier to be deactivated. In some example embodiments, the carrier activation request message can be a media access control (MAC) control element (CE) including a carrier activation indication for a particular component carrier(s). It will be appreciated, however, that other types of messages and other signaling layers that can be used for communication between a wireless communication device and serving network are contemplated within the scope of the disclosure.

In some embodiments in which the carrier activation request message is a MAC CE, the Activation Request MAC Control Element CE can be identified by a MAC protocol data unit (PDU) with LCID as described above with respect to the example deactivation notification MAC CE. $C_i$: if there is an SCell (or secondary Carrier Component CC) configured with SCellIndex this field can indicate the activation request of the SCell with SCellIndex i. The Ci field can be set to "1" to notify that the SCell with SCellIndex i is requested to be activated. The C, field set to "0" can be ignored by the network. R: Reserved bit, can be set to "0".

Figure 5:
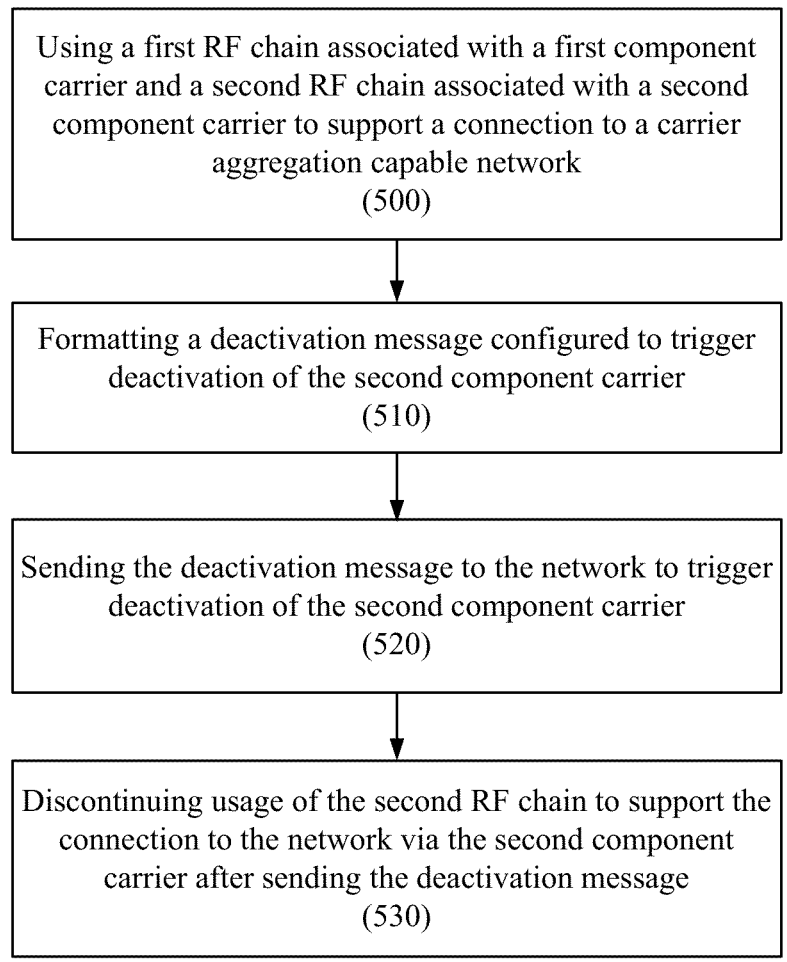
FIG. 5 illustrates a flowchart according to an example method for deactivating a component carrier in accordance with some example embodiments.

FIG. 5 illustrates a flowchart according to an example method for deactivating a component carrier in accordance with some example embodiments. In this regard, FIG. 5 illustrates operations that can be performed by a carrier aggregation capable wireless communication device, such as wireless communication device 302, which includes at least two RF chains in accordance with some example embodiments. One or more of processing circuitry 410, processor 412, memory 414, transceiver(s) 416, or RF chain controller 418 can, for example, provide means for performing the operations illustrated in and described with respect to FIG. 5.

Operation 500 can include the wireless communication device 302 using a first RF chain associated with a first component carrier and a second RF chain associated with a second component carrier to support a connection to a carrier aggregation capable network. The first component carrier can be a primary component carrier, or can be a secondary component carrier. The second component carrier can be a secondary component carrier.

Operation 510 can include the wireless communication device 302 formatting a deactivation message configured to trigger deactivation of the second component carrier. The deactivation message can include an indication of the second component carrier to inform the network of the component carrier being deactivated. In embodiments in which the wireless communication device 302 can trigger deactivation and discontinue usage of a component carrier without permission of the network, the deactivation message can, for example, be a deactivation notification message. In embodiments in which the wireless communication device 302 waits for network permission before discontinuing usage of a component carrier, the deactivation message can be a deactivation request message. The deactivation message can, for example, be a MAC CE including a deactivation indication for the second component carrier, such as described in the examples above.

Operation 520 can include the wireless communication device 302 sending the deactivation message to the network to trigger deactivation of the second component carrier. Operation 530 can include the wireless communication device 302 discontinuing usage of the second RF chain to support the connection to the network via the second component carrier after sending the deactivation message.

In embodiments in which the deactivation message sent in operation 520 is a deactivation request message, the wireless communication device 302 can wait for a deactivation permission response from the network before performing operation 530. If the network denies the request to deactivate the second component carrier, operation 530 can be omitted.

In embodiments in which the deactivation message sent in operation 520 is a deactivation notification message, the wireless communication device 302 can wait to receive an ACK from the network in response to the deactivation notification message network before performing operation 530. If an ACK is not received (e.g., within a certain period of time) and/or if a non-acknowledgement (NACK) is received, operation 520 can be repeated. Alternatively, the wireless communication device 302 can perform operation 530 after sending the deactivation notification message without waiting to receive an ACK from the network.

Figure 6:
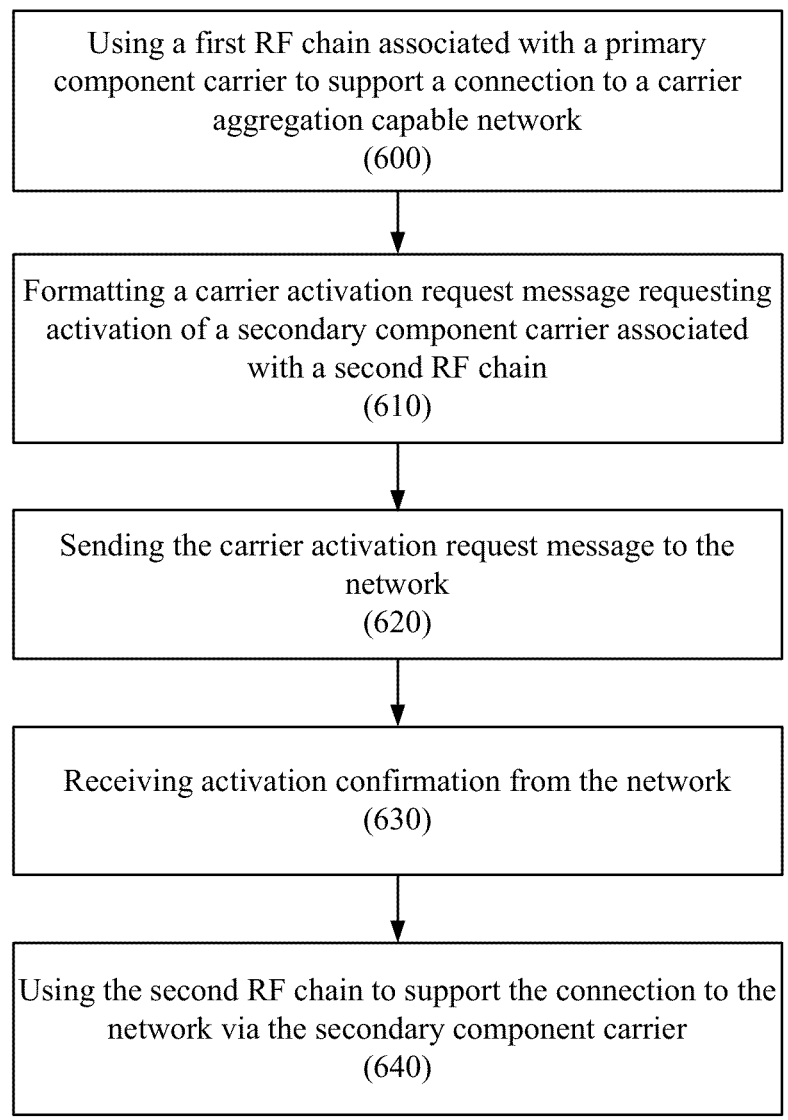
FIG. 6 illustrates a flowchart according to an example method for activating a component carrier in accordance with some example embodiments.

FIG. 6 illustrates a flowchart according to an example method for activating a component carrier in accordance with some example embodiments. In this regard, FIG. 6 illustrates operations that can be performed by a carrier aggregation capable wireless communication device, such as wireless communication device 302, which includes at least two RF chains in accordance with some example embodiments. One or more of processing circuitry 410, processor 412, memory 414, transceiver(s) 416, or RF chain controller 418 can, for example, provide means for performing the operations illustrated in and described with respect to FIG. 6. The operations illustrated in and described with respect to FIG. 6 can be performed at any time at which the wireless communication device has an available RF chain and is on a carrier aggregation capable network that is capable of supporting an additional active component carrier. Thus, for example, the operations illustrated in FIG. 6 can be performed after performance of operation 530. As a further, example, the operations illustrated in FIG. 6 can be performed prior to the performance of the operations illustrated in and described with respect to FIG. 5.

Operation 600 can include the wireless communication device 302 using a first RF chain associated with a primary component carrier to support a connection to a carrier aggregation capable network. In some instances, the wireless communication device 302 may only have a primary component carrier activated at operation 600. However, in other instances, the wireless communication device 302 may additionally have one or more active secondary component carriers, but may determine to activate at least one further secondary component carrier to be used to support the connection to the carrier aggregation capable network on an available RF chain(s).

Operation 610 can include the wireless communication device 302 formatting a carrier activation request message requesting activation of a secondary component carrier associated with a second RF chain. The carrier activation request message can include an indication identifying the carrier for which activation is requested. In some example embodiments, the carrier activation request message can, for example, be a MAC CE including a carrier activation indication identifying the secondary component carrier for which activation is requested, such as described in the examples above.

Operation 620 can include the wireless communication device 302 sending the carrier activation request message to the network. The network can be configured to activate the secondary component carrier in response to the request, and can respond with an activation confirmation, which can be received by the wireless communication device 302 in operation 630. After the secondary component carrier has been activated, the wireless communication device 302 can use the second RF chain to support the connection to the network via the secondary component carrier (e.g., in conjunction with usage of the first RF chain to support the connection via the primary component carrier), at operation 640.

Repurposing an Available RF Chain

As discussed, a wireless communication device capable of carrier aggregation can include two or more RF chains that can be combined to aggregate two or more received signals to increase processed throughput for the device. The received signals can be adjacent to each other (in frequency), or can be separated from one another, yet still in a common frequency band. In some cases, the received signals can be separated from one another by a larger amount of frequency such that received signals can be included in separate frequency bands. Thus, RF chains can be typically tuned and controlled relatively independently from one another.

When an RF chain is not being used for carrier aggregation, such as when a wireless communication device is operating in an MCC network but a component carrier associated with the RF chain has been deactivated, the RF chain can be available to be repurposed for a function other than communication via a second component carrier in support of a carrier aggregation connection to a network. Thus, for example, an RF chain can become available and can be repurposed by the RF chain controller 418 following performance of operation 530 in accordance with some example embodiments. As a further example, an RF chain can be available for repurposing when the wireless communication device 302 is operating in a non-MCC network (e.g., a network that does not support the usage of multiple component carriers for carrier aggregation) and/or when carrier aggregation is not activated.

By temporarily repurposing at least one of the RF chains included in carrier aggregation capable wireless communication device, the user experience can be improved. In this regard, an available RF chain can be repurposed to perform a variety of functions while one or more other RF chains continue to be used to support a connection to a serving network. As such an available RF chain can be repurposed to allow performance of a function in parallel with an ongoing communication session (e.g., a voice call, data session, and/or other communication session) that can occur over a serving network without interrupting the ongoing communication session, which can be supported by one or more further RF chains. A variety of functions that can be performed with a repurposed RF chain that is not associated with an active component carrier are described further herein below. Temporarily repurposing an RF chain in this manner can improve user experience by reducing a response time for the wireless communication device to react to environmental conditions.

Figure 7:
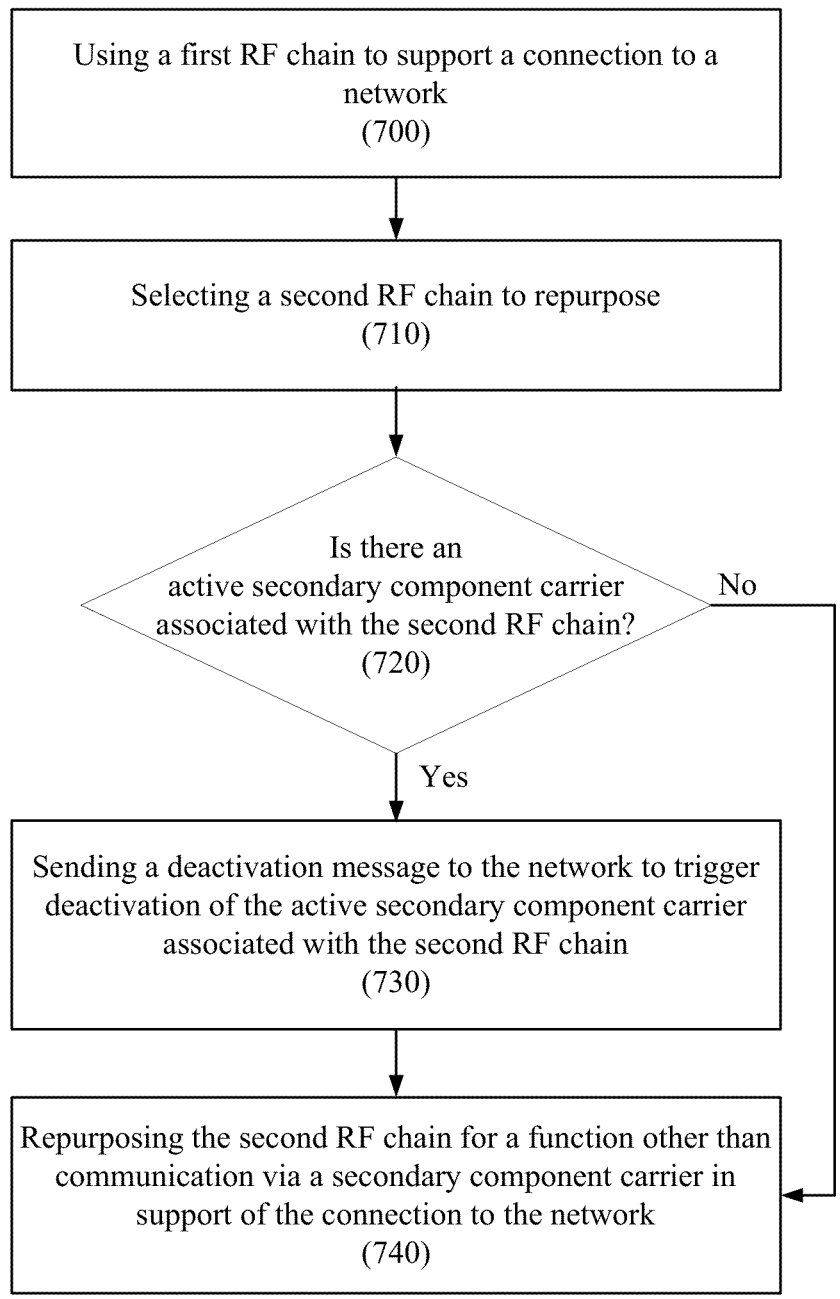
FIG. 7 illustrates a flow chart according to an example method for repurposing an RF chain in accordance with some example embodiments.

FIG. 7 illustrates a flow chart according to an example method for repurposing an RF chain in accordance with some example embodiments. In this regard, FIG. 7 illustrates operations that can be performed by a carrier aggregation capable wireless communication device, such as wireless communication device 302, which includes at least two RF chains in accordance with some example embodiments. One or more of processing circuitry 410, processor 412, memory 414, transceiver(s) 416, or RF chain controller 418 can, for example, provide means for performing the operations illustrated in and described with respect to FIG. 7.

Operation 700 can include the wireless communication device 302 using a first RF chain to support a connection to a network. In an instance in which the network is a carrier aggregation capable, or MCC network, operation 700 can include using the first RF chain to support the connection to the network via a primary component carrier.

Operation 710 can include the wireless communication device 302 selecting a second RF chain to repurpose. Operation 720 can include the wireless communication device 302 determining whether there is an active secondary component carrier associated with the second RF chain. In some example embodiments, operation 720 can include the wireless communication device 302 determining whether the network to which the device is connected is an MCC network. If the network is not an MCC network, the wireless communication device 302 can determine that there is not an active secondary component carrier associated with the second RF chain.

In an instance in which it is determined at operation 720 that there is an active secondary component carrier associated with the second RF chain, the method can proceed to operation 730, which can include the wireless communication device 302 sending a deactivation message to the network to trigger deactivation of the active secondary component carrier associated with the second RF chain. The deactivation message can, for example, correspond to the deactivation message that can be formatted and sent in operations 510 and 520. The deactivation message can include an indication of the secondary component carrier to inform the network of the component carrier to be deactivated. In embodiments in which the wireless communication device 302 can trigger deactivation and discontinue usage of a component carrier without permission of the network, the deactivation message can, for example, be a deactivation notification message. In embodiments in which the wireless communication device 302 waits for network permission before discontinuing usage of a component carrier, the deactivation message can be a deactivation request message. The deactivation message can, for example, be a MAC CE including a deactivation indication for the secondary component carrier.

Operation 740 can include the wireless communication device 302 repurposing the second RF chain for a function other than communication via a secondary component carrier in support of the connection to the network. Various example functions that can be performed with a repurposed RF chain attendant to performance of operation 740 are described further herein below, such as with respect to FIGS. 8-14.

In embodiments in which the deactivation message sent in operation 730 is a deactivation request message, the wireless communication device 302 can wait for a deactivation permission response from the network before performing operation 740. If the network denies the request to deactivate the second component carrier, operation 740 can be omitted.

In embodiments in which the deactivation message sent in operation 730 is a deactivation notification message, the wireless communication device 302 can wait to receive an ACK from the network in response to the deactivation notification message network before performing operation 740. If an ACK is not received (e.g., within a certain period of time) and/or if a NACK is received, operation 730 can be repeated. Alternatively, the wireless communication device 302 can perform operation 740 after sending the deactivation notification message without waiting to receive an ACK from the network.

In an instance in which it is determined at operation 720 that there is not an active secondary component carrier associated with the second RF chain, operation 730 can be omitted and the method can instead proceed directly to operation 740.

Repurposing an RF Chain to Listen for Paging Messages

In some example embodiments, an RF chain can be repurposed to improve user experience by reducing response time to react to environmental conditions, such as incoming pages. For example, if a carrier aggregation capable wireless communication device is operating in an LTE or other packet switched network that cannot support voice (VOIP) calls, then the wireless communication device may have to switch networks to support a voice call through a mechanism commonly called Circuit Switched Fall Back (CSFB). Briefly, CSFB requires the wireless communication device to transition from an LTE network to a legacy network, such as a second generation (2G), such as a Global System for Mobile Communications Network (GSM), or third generation (3G) network, such as a CDMA2000 (1x) network, that has a circuit switched domain configured to handle a voice call. After termination of the voice call, the wireless communication device can return to the LTE network.

Pages for a circuit switched call from the network to the wireless communication device can be sent on either the serving network (e.g., the LTE network) or on a legacy network (e.g., a 2G or 3G network) on which the voice call may be serviced. Often the circuit switched call page can be forwarded by the network from the legacy network, through the LTE (or other serving network) network to the wireless communication device. However, in some instances, the page may only occur on the legacy network, and the device can have to at least temporarily tune to the legacy network in order to receive and decode the page. If a device camping on an LTE network that does not support CSFB tunes a single radio connection from the LTE network to a 1x network to receive and decode a voice page sent via the 1x network, the device's communication with the LTE network will be interrupted during the period in which the device is tuned to the 1x network to receive and decode the page. This interruption in communication with the LTE network can result in degradation of user experience, and, if the time needed to decode the page is long enough, can cause a termination of the radio resource control (RRC) connection with the LTE network. Further, in some instances, forwarding the page to the serving network may result in a delay in the device receiving the delay.

A carrier aggregation capable wireless communication device with an inactive or otherwise available RF chain can temporarily repurpose the RF chain to monitor a first network (e.g., a legacy network) for paging messages while actively connected to a second network (e.g., an LTE network). By monitoring the first network, response time for handling a circuit switched voice call can be reduced. Moreover, by repurposing an RF chain to monitor a first network for paging messages while maintaining the connection to the second network via one or more other RF chains, a carrier aggregation capable device can maintain the connection to the second network, thus providing a better user experience.

Figure 8:
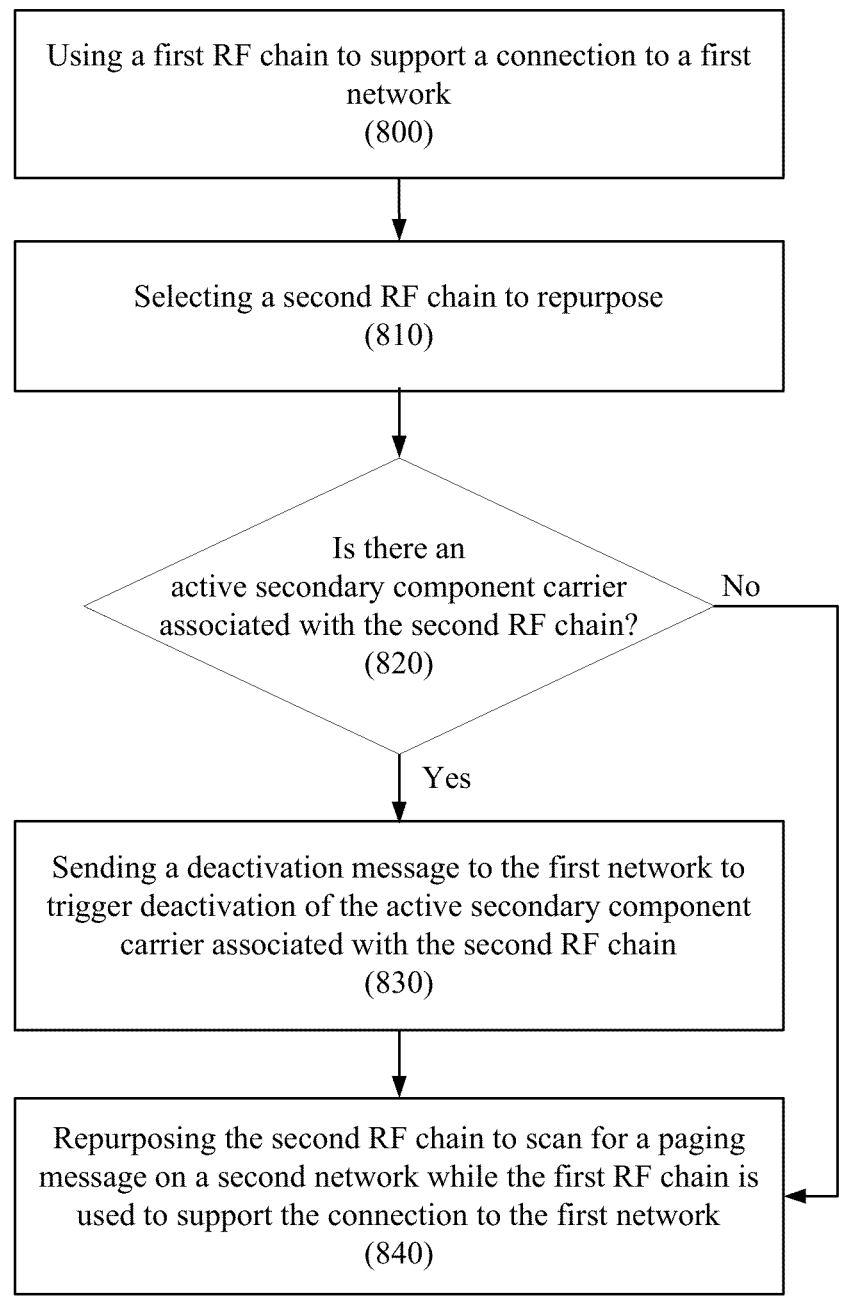
FIG. 8 illustrates a flow chart according to an example method for repurposing an RF chain to scan for a paging message in accordance with some example embodiments.

FIG. 8 illustrates a flow chart according to an example method for repurposing an RF chain to scan for a paging message in accordance with some example embodiments. In this regard, FIG. 8 illustrates an embodiment of FIG. 7 in which an RF chain can be repurposed by a carrier aggregation capable wireless communication device, such as wireless communication device 302, to scan for paging messages. One or more of processing circuitry 410, processor 412, memory 414, transceiver(s) 416, or RF chain controller 418 can, for example, provide means for performing the operations illustrated in and described with respect to FIG. 8.

Operation 800 can include the wireless communication device 302 using a first RF chain to support a connection to a first network. The first network may be an MCC network, or may be a network that does not support carrier aggregation. In some instances in which the first network is an MCC network, the first RF chain can be used to support a connection to the network via a primary component carrier. In some example embodiments, the first network can be an LTE network or other packet switched network that does not support VOIP voice calls. Operation 800 can, for example, correspond to an embodiment of operation 700.

Operation 810 can include the wireless communication device 302 selecting a second RF chain to repurpose. Operation 820 can include the wireless communication device determining whether there is an active secondary component carrier associated with the second RF chain. In an instance in which it is determined at operation 820 that there is an active secondary component carrier associated with the second RF chain, the method can proceed to operation 830, which can include the wireless communication device 302 sending a deactivation message to the first network to trigger deactivation of the active secondary component carrier associated with the second RF chain. In this regard, operations 810-830 can correspond to operations 710-730 as described above.

Operation 840 can include the wireless communication device 302 repurposing the second RF chain to scan for a paging message on a second network while the first RF chain is used to support the connection to the first network. In this regard, operation 840 can correspond to an embodiment of operation 740. The second network can, for example, be a 2G network, 3G network, or other legacy network which can support circuit switched voice calls.

In an instance in which it is determined at operation 820 that there is not an active secondary component carrier associated with the second RF chain, operation 830 can be omitted and the method can instead proceed directly to operation 840.

Repurposing an RF Chain to Perform a PLMN Search

A wireless communication device can operate by connecting to a public land mobile network (PLMN). Wireless communication devices and/or subscribers associated therewith often have a home PLMN (HPLMN) that can be a preferred network for the device to operate within. If a device roams beyond a coverage area of its HPLMN, then the device can connect through another, different PLMN. A device connected to a PLMN other than its HPLMN can be referred to as "roaming." While roaming, the device can search for a higher priority PLMN, such as, by way of non-limiting example, its HPLMN to use instead of the present serving PLMN on which it is roaming.

In accordance with some example embodiments, an RF chain in a carrier aggregation capable wireless communication device can be repurposed to improve user experience by searching for a higher priority PLMN while roaming. Repurposing an RF chain to scan for a higher priority PLMN can enable a device to perform a PLMN search in parallel to an ongoing session on a serving PLMN (e.g., the roaming PLMN) without interrupting the connection to the serving PLMN, such as by performing a tuneaway to scan for a higher priority PLMN on a primary RF chain used to support the connection to the serving PLMN. Accordingly, user experience can be improved through reduced interruptions and delays in data or other communication sessions when performing a PLMN search. Further, such example embodiments can enable a wireless communication device to more quickly identify and transition to a higher priority PLMN, which can reduce roaming charges that can be incurred by a subscriber when a device is roaming outside of its HPLMN.

Figure 9:
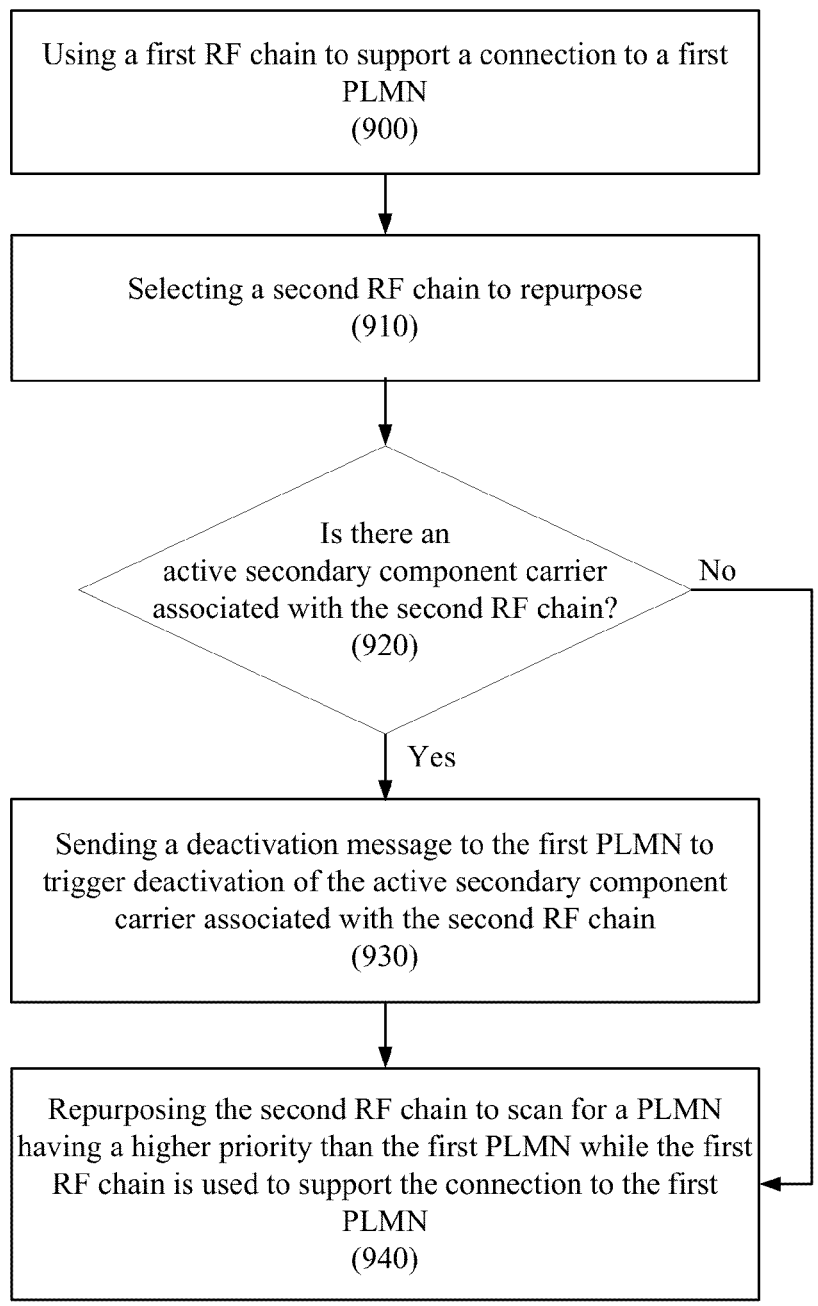
FIG. 9 illustrates a flow chart according to an example method for repurposing an RF chain to scan for a higher priority network in accordance with some example embodiments.

FIG. 9 illustrates a flow chart according to an example method for repurposing an RF chain to scan for a higher priority network in accordance with some example embodiments. In this regard, FIG. 9 illustrates an embodiment of FIG. 7 in which an RF chain can be repurposed by a carrier aggregation capable wireless communication device, such as wireless communication device 302, to scan for a higher priority PLMN than a present serving PLMN. One or more of processing circuitry 410, processor 412, memory 414, transceiver(s) 416, or RF chain controller 418 can, for example, provide means for performing the operations illustrated in and described with respect to FIG. 9.

Operation 900 can include the wireless communication device 302 using a first RF chain to support a connection to a first PLMN. The first PLMN may be an MCC network, or may be a network that does not support carrier aggregation. In some instances in which the first PLMN is an MCC network, the first RF chain can be used to support a connection to the network via a primary component carrier. In some example embodiments, the first PLMN can be a roaming PLMN such that the wireless communication device 302 can be roaming while connected to the first PLMN. Operation 900 can, for example, correspond to an embodiment of operation 700.

Operation 910 can include the wireless communication device 302 selecting a second RF chain to repurpose. Operation 920 can include the wireless communication device determining whether there is an active secondary component carrier associated with the second RF chain. In an instance in which it is determined at operation 920 that there is an active secondary component carrier associated with the second RF chain, the method can proceed to operation 930, which can include the wireless communication device 302 sending a deactivation message to the first PLMN to trigger deactivation of the active secondary component carrier associated with the second RF chain. In this regard, operations 910-930 can correspond to operations 710-730 as described above.

Operation 940 can include the wireless communication device 302 repurposing the second RF chain to scan for a PLMN having a higher priority than the first PLMN while the first RF chain is used to support the connection to the first PLMN. In this regard, operation 940 can correspond to an embodiment of operation 740.

In an instance in which it is determined at operation 920 that there is not an active secondary component carrier associated with the second RF chain, operation 930 can be omitted and the method can instead proceed directly to operation 940.

Figure 10:
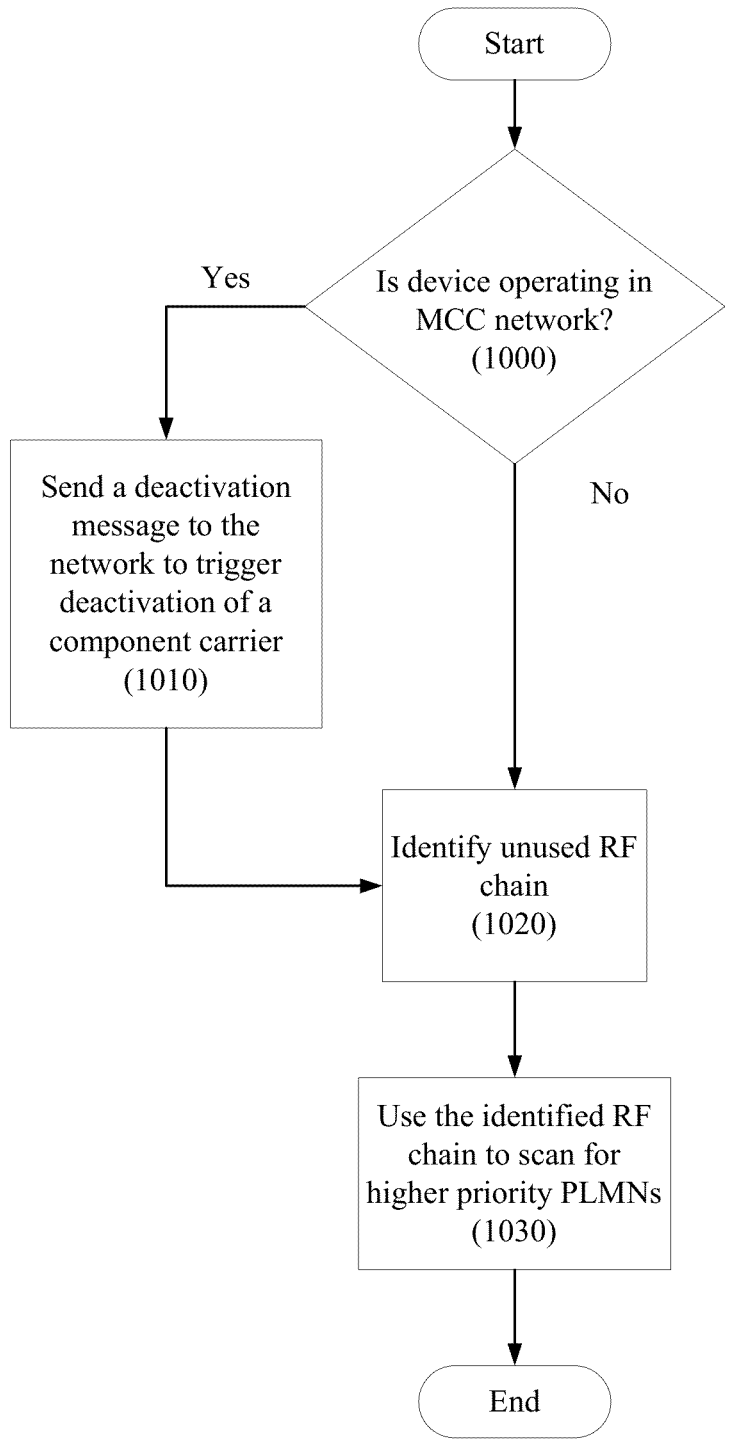
FIG. 10 illustrates a flow chart according to another example method for repurposing an RF chain to scan for a higher priority network in accordance with some example embodiments.

FIG. 10 illustrates a flow chart according to another example method for repurposing an RF chain to scan for a higher priority network in accordance with some example embodiments. In this regard, FIG. 10 illustrates a method that can be performed by a carrier aggregation capable wireless communication device, such as wireless communication device 302, in accordance with some example embodiments. One or more of processing circuitry 410, processor 412, memory 414, transceiver(s) 416, or RF chain controller 418 can, for example, provide means for performing the operations illustrated in and described with respect to FIG. 10.

Operation 1000 can include the wireless communication device 302 determining whether it is operating in a MCC network. As described above, multiple carrier networks can use carrier aggregation to increase bandwidth to a wireless communication device. If the wireless communication device 302 is operating in a MCC network, then the method can proceed to operation 1010, which can include the wireless communication device 302 sending a deactivation message to the network to trigger deactivation of a component carrier. If, however, it is determined at operation 1000 that the wireless communication device 302 is not operating in an MCC network, then the device can already have an unused RF chain, and operation 1010 can be omitted. In operation 1020, the wireless communication device 302 can identify an unused RF chain. The identified RF chain can be the RF chain released in response to the deactivation message sent in operation 1010, or an available RF chain that can result from operating a carrier aggregation capable wireless communication device in a non MCC network.

Operation 1030 can include the wireless communication device 302 repurposing the identified RF chain by using the identified RF chain to scan for higher priority PLMNs. In some embodiments, the scan can be periodic. In some example embodiments, the scanning of operation 1030 can be performed while one or more other RF chains associated with the wireless communication device 302 are connected to another network(s), such as a serving PLMN. If a higher priority PLMN is located than the current serving PLMN, the wireless communication device 302 can connect to the located higher priority PLMN.

Repurposing an RF Chain to Perform a Parallel Measurement

In some example embodiments, an RF chain can be repurposed to perform a parallel measurement. In this regard, while a wireless communication device is serving an application requiring network communication, such as a voice or a video (or other data) application, the wireless communication device can perform serving network interfrequency measurements (e.g., LTE interfrequency measurements) and/or can perform inter-RAT measurements to measure characteristics of an alternative RAT to the RAT implemented by the serving network. A wireless communication device can typically measure the interfrequency and inter-RAT characteristics during gaps in radio transmissions. However, in certain conditions, such as when signal quality from a serving cell on the serving RAT falls below a predetermined threshold (e.g., because of low received signal strength or nearby signal interference or blockers) then implementing a parallel measurement operational mode by repurposing an available RF chain as describe further below can provide a better user experience.

When the signal quality of the serving is decreasing, waiting for gaps to measure and characterize neighboring frequencies and/or alternative RATs may delay the transition of the wireless communication device from the serving cell to a target cell offering better signal quality. This can be particularly true when the device is mobile, such as in a moving vehicle. To reduce this delay, a parallel measurement mode can be used that can allow a voice call or data transfer to occur in parallel on the serving cell with the support of a first RF chain while performing interfrequency measurements and/or inter-RAT measurements of a target cell with a second RF chain.

Figure 11:
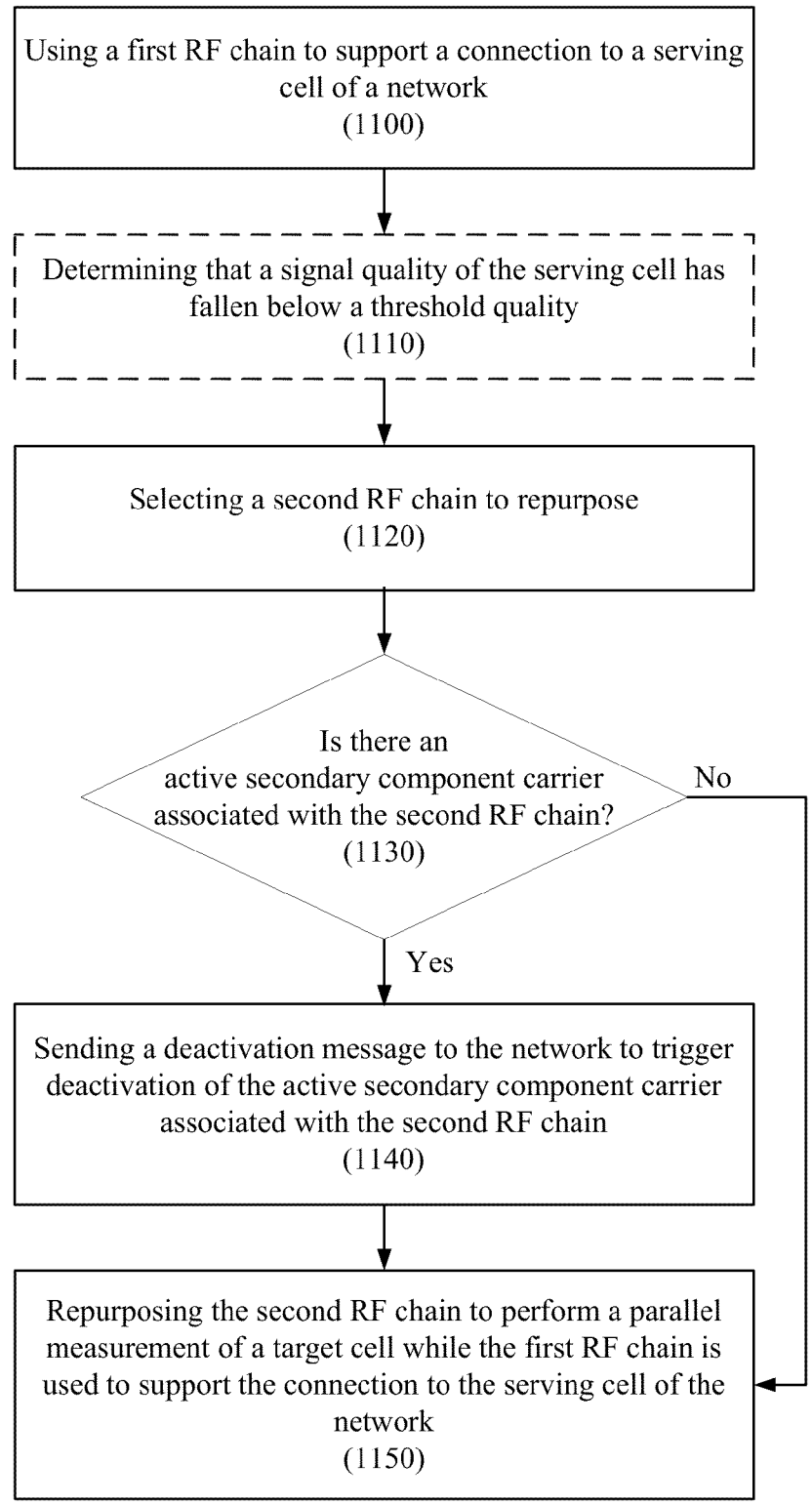
FIG. 11 illustrates a flow chart according to an example method for repurposing an RF chain to perform a parallel measurement in accordance with some example embodiments.

FIG. 11 illustrates a flow chart according to an example method for repurposing an RF chain to perform a parallel measurement in accordance with some example embodiments. In this regard, FIG. 11 illustrates an embodiment of FIG. 7 in which an RF chain can be repurposed by a carrier aggregation capable wireless communication device, such as wireless communication device 302, to perform parallel measurements of a target cell, such as, inter-frequency measurements of a target cell on a serving network and/or inter-RAT measurements of a target cell on an alternate RAT. One or more of processing circuitry 410, processor 412, memory 414, transceiver(s) 416, or RF chain controller 418 can, for example, provide means for performing the operations illustrated in and described with respect to FIG. 11.

Operation 1100 can include the wireless communication device 302 using a first RF chain to support a connection to a serving cell of a network. The network be an MCC network, or may be a network that does not support carrier aggregation. In some instances in which the network is an MCC network, the first RF chain can be used to support a connection to the network via a primary component carrier. Operation 1100 can, for example, correspond to an embodiment of operation 700.

In some example embodiments, the performance of parallel measurements in accordance with the method of FIG. 11 can be triggered in response to a determination that a signal quality of the serving cell, such as a reference signal received quality (RSRQ), reference signal received power (RSRP), received signal strength indicator (RSSI), received signal code power (RSCP), and/or other measure of signal quality, has fallen below a threshold quality. In such example embodiments, the method can optionally include operation 1110, which can include the wireless communication device 302 determining that a signal quality of the serving cell has fallen below the threshold quality. In alternative embodiments, however, parallel measurements can be performed (e.g., periodically) regardless of the signal quality of the serving cell, and operation 1110 can be omitted.

Operation 1120 can include the wireless communication device 302 selecting a second RF chain to repurpose. Operation 1130 can include the wireless communication device determining whether there is an active secondary component carrier associated with the second RF chain. In an instance in which it is determined at operation 1130 that there is an active secondary component carrier associated with the second RF chain, the method can proceed to operation 1140, which can include the wireless communication device 302 sending a deactivation message to the network to trigger deactivation of the active secondary component carrier associated with the second RF chain. In this regard, operations 1120-1140 can correspond to operations 710-730 as described above.

Operation 1150 can include the wireless communication device 302 repurposing the second RF chain to perform a parallel measurement of a target cell while the first RF chain is used to support the connection to the serving cell of the network. In this regard, operation 1150 can correspond to an embodiment of operation 740. In some example instances, the target cell can be a target cell on the serving network, and performance of the parallel measurement can include performance of an interfrequency measurement. In some instances, the target cell can be a target cell of an alternative RAT, and performance of the parallel measurement can include performance of an inter-RAT measurement. In some example embodiments, operation 1150 can be performed concurrent with (e.g., in parallel to) an active communication session over the connection to the serving cell of the serving network that can be supported by the first RF chain. In some example embodiments, operation 1150 can further include using the second RF chain to perform synchronization with the target cell so as to facilitate a faster handoff from the serving cell to the target cell.

In an instance in which it is determined at operation 1130 that there is not an active secondary component carrier associated with the second RF chain, operation 1140 can be omitted and the method can instead proceed directly to operation 1150.

Figure 12:
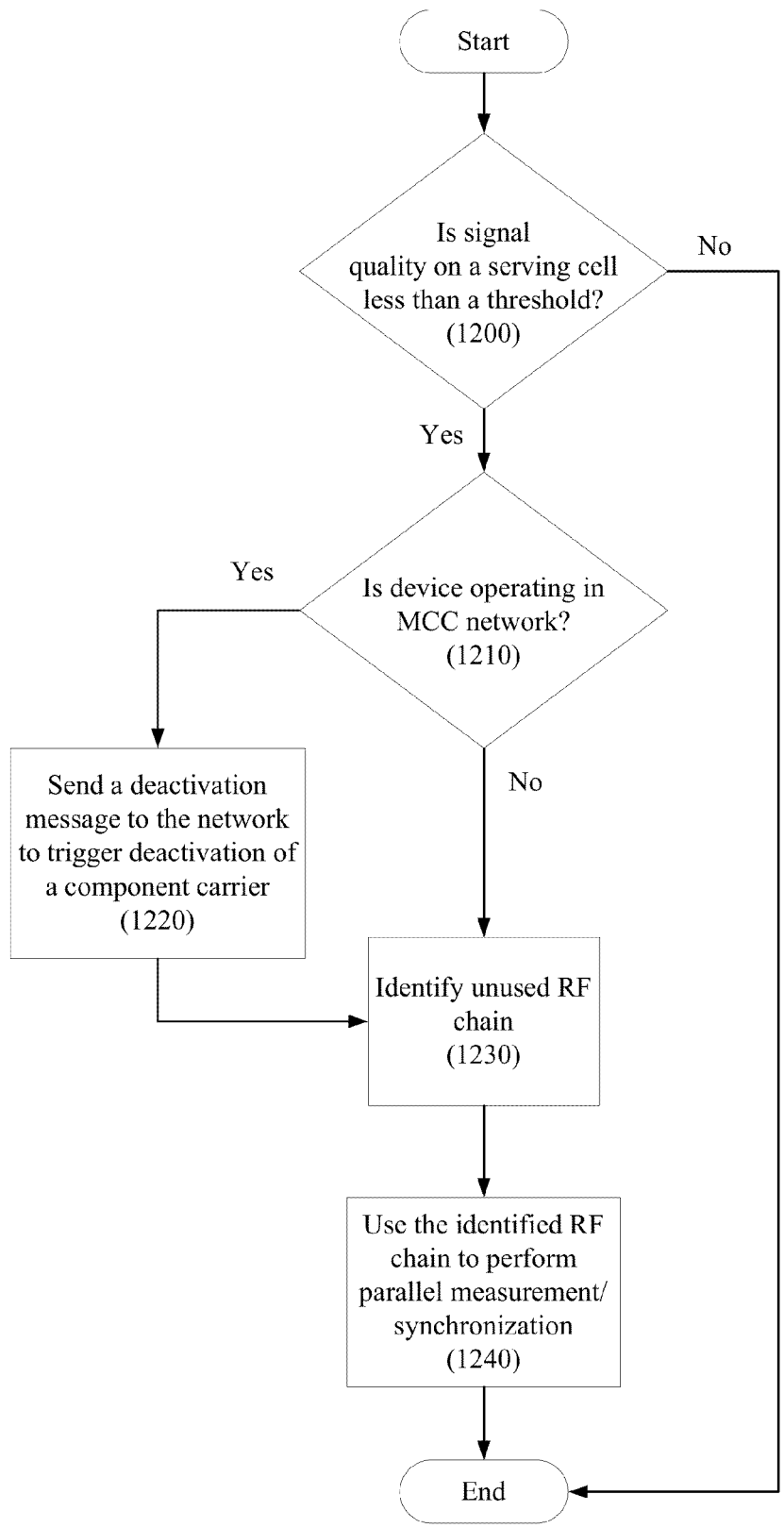
FIG. 12 illustrates a flow chart according to another example method for repurposing an RF chain to perform a parallel measurement in accordance with some example embodiments.

FIG. 12 illustrates a flow chart according to another example method for repurposing an RF chain to perform a parallel measurement in accordance with some example embodiments. In this regard, FIG. 12 illustrates a method that can be performed by a carrier aggregation capable wireless communication device, such as wireless communication device 302, in accordance with some example embodiments. One or more of processing circuitry 410, processor 412, memory 414, transceiver(s) 416, or RF chain controller 418 can, for example, provide means for performing the operations illustrated in and described with respect to FIG. 12.

Operation 1200 can include the wireless communication device 302 determining whether the signal quality from the serving cell is less than a predetermined threshold. In some embodiments, signal quality can be a received power level measurement. In other embodiments, signal quality can additionally or alternatively be determined by measuring interference from nearby frequencies. In still other embodiments, signal quality can be additionally or alternatively determined by measuring interference from other nearby radio access technologies.

If the signal quality is not less than the threshold, then the method can terminate. On the other hand, if the signal quality is determined to be less than the threshold, the method can proceed to operation 1210, which can include the wireless communication device 302 determining whether it is operating in a MCC network. If it is determined in operation 1210 that the wireless communication device 302 is operating in a MCC network, then the method can proceed to operation 1220, in which the wireless communication device 302 can send a deactivation message to the network to trigger deactivation of a component carrier to free an RF chain for repurposing. If, however, it is determined at operation 1210 that the wireless communication device 302 is not operating in an MCC network, then the device can already have an unused RF chain, and operation 1220 can be omitted. In operation 1230, the wireless communication device 302 can identify an unused RF chain. The identified RF chain can be the RF chain released in response to the deactivation message sent in operation 1220, or an available RF chain that can result from operating a carrier aggregation capable wireless communication device in a non MCC network.

Operation 1240 can include the wireless communication device 302 repurposing the identified RF chain by using the identified RF chain to perform parallel measurements, such as interfrequency measurements of nearby cells (e.g., nearby LTE frequencies and/or inter-RAT measurements of nearby RAT frequencies. The parallel measurements can be made with the unused RF chain while the device can be engaged in a voice call and/or other data application via the serving cell with the support of another RF chain.

Synchronization with a candidate cell can also be performed in step 1240. Synchronization can typically occur before a device is handed off from a current serving cell to a target cell. Frequency and timing information can be synchronized between the device and the target cell prior to hand off to ensure a quick and smooth transition. By using an unused RF chain to perform synchronization tasks, hand off can be smoother, especially when the signal quality with the serving cell is below a threshold or falling rapidly.

In some example embodiments, the parallel measurement mode, such as that described in FIGS. 11 and 12, may consume more power than waiting for gaps in radio transmissions to measure and characterize serving network and/or inter-RAT frequencies. Parallel measurement mode may provide a better user experience when the device is in a mobility state and the signal quality from a serving cell may be falling off quickly. Sometimes, the call (or data service) may be dropped before the UE can be handed over to another cell if characterizations and synchronizations are not completed quickly enough. As such, parallel measurement mode can be implemented in response to a device being in a mobility state and/or in response to the signal quality of the serving cell dropping (e.g., below a threshold) in accordance with some example embodiments.

Repurposing an RF Chain to Perform an Autonomous Measurement

In some example embodiments, an RF chain can be repurposed to perform an autonomous measurement. Autonomous measurements can be defined by an operating standard. Autonomous measurements can be used to determine the presence of femtocells, such as closed subscriber group (CSG) cells, that may be available to a wireless communication device. However, a device can suffer some degradation in throughput when performing autonomous measurements by temporarily using radio resources for autonomous measurement instead of transferring data on a connection to a serving network/serving cell. In some cases, a device can periodically take 150 milliseconds (ms) to perform an autonomous measurement. This 150 ms interruption in a connection can affect voice or data throughput for an active connection to a serving network/serving cell. Some example embodiments address this problem by repurposing an RF chain on a carrier aggregation capable wireless communication device to perform an autonomous measurement in parallel to an ongoing communication session (e.g., a voice and/or data session) on a serving network/serving cell, which can be concurrently supported by another RF chain.

Figure 13:
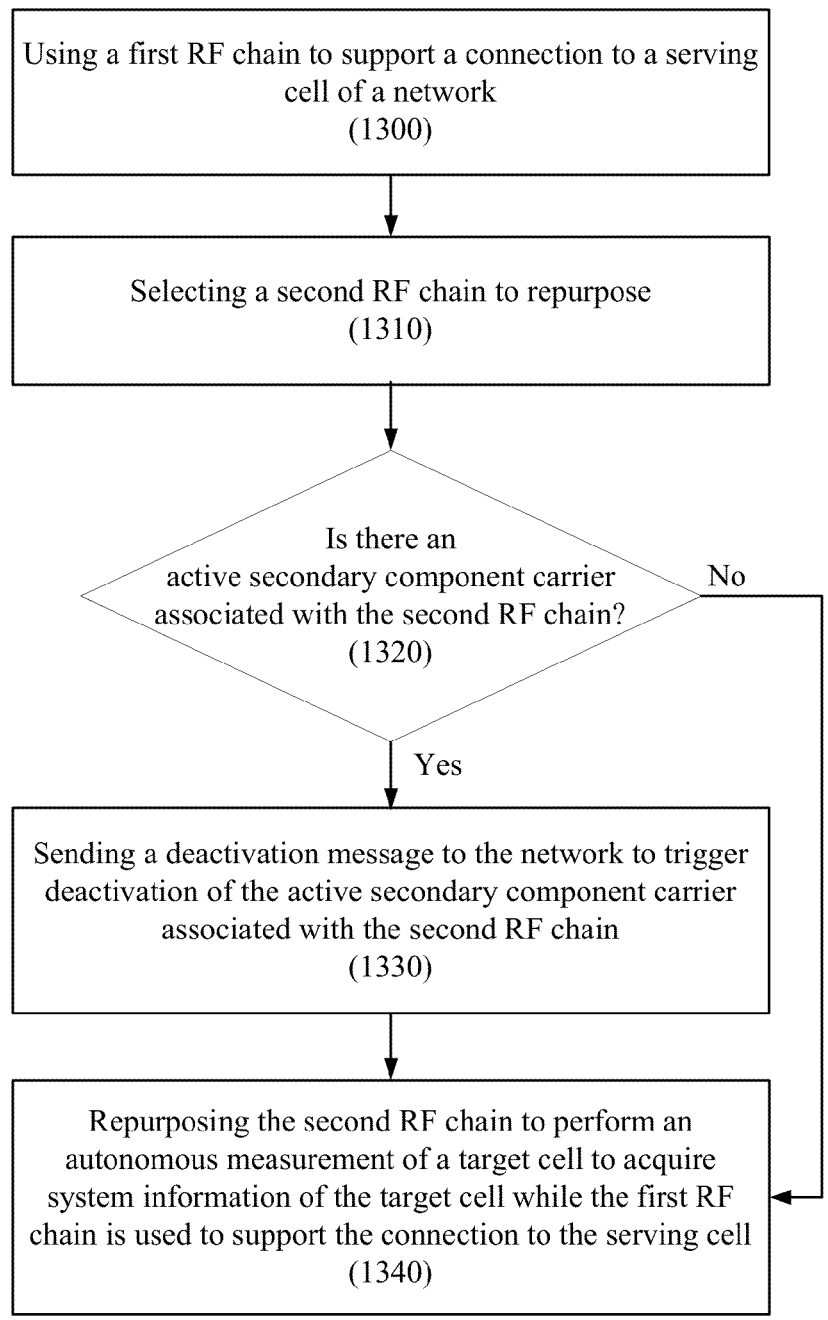
FIG. 13 illustrates a flow chart according to an example method for repurposing an RF chain to perform an autonomous measurement in accordance with some example embodiments.

FIG. 13 illustrates a flow chart according to an example method for repurposing an RF chain to perform an autonomous measurement in accordance with some example embodiments. In this regard, FIG. 13 illustrates an embodiment of FIG. 7 in which an RF chain can be repurposed by a carrier aggregation capable wireless communication device, such as wireless communication device 302, to perform an autonomous measurement. One or more of processing circuitry 410, processor 412, memory 414, transceiver(s) 416, or RF chain controller 418 can, for example, provide means for performing the operations illustrated in and described with respect to FIG. 13.

Operation 1300 can include the wireless communication device 302 using a first RF chain to support a connection to a serving cell of a network. The network may be an MCC network, or may be a network that does not support carrier aggregation. In some instances in which the network is an MCC network, the first RF chain can be used to support a connection to the network via a primary component carrier. Operation 1300 can, for example, correspond to an embodiment of operation 700.

Operation 1310 can include the wireless communication device 302 selecting a second RF chain to repurpose. Operation 1320 can include the wireless communication device determining whether there is an active secondary component carrier associated with the second RF chain. In an instance in which it is determined at operation 1320 that there is an active secondary component carrier associated with the second RF chain, the method can proceed to operation 1330, which can include the wireless communication device 302 sending a deactivation message to the network to trigger deactivation of the active secondary component carrier associated with the second RF chain. In this regard, operations 1310-1330 can correspond to operations 710-730 as described above.

Operation 1340 can include the wireless communication device 302 repurposing the second RF chain to perform an autonomous measurement of a target cell to acquire system information of the target cell while the first RF chain is used to support the connection to the serving cell. In this regard, operation 1340 can correspond to an embodiment of operation 740. The target cell can, for example, be a cell of the serving network, or can be a cell of another network. The acquired system information can be used to facilitate cell discovery, synchronization, and handover procedures.

In an instance in which it is determined at operation 1320 that there is not an active secondary component carrier associated with the second RF chain, operation 1330 can be omitted and the method can instead proceed directly to operation 1340.

In some example embodiments, autonomous measurements, such as autonomous measurements that can be performed attendant to performance of operation 1340, can be used to facilitate detection and association with a CSG cell, such as a home evolved Node B (eNB), or other femtocell. A home eNB can be a very small serving cell that a user can deploy to improve cell service in a limited area, such as a home or office. In many instances, a network operator may not have knowledge of the placement of a home eNB, so autonomous measurements may be needed to facilitate awareness by a wireless communication device of the presence of a home eNB. Furthermore, use of the home eNB can be limited to only a group of authorized users, known as a CSG. Autonomous measurements can accordingly be used to (1) detect the presence of a home eNB or other CSG cell; (2) measure the receive signal level and quality of the CSG cell; and (3) detect system information of the CSG. Detection of the system information can, for example, include determining the cell ID and determining whether the wireless communication device 302 is authorized to register to the CSG cell (e.g., whether the device or user associated therewith is a member of the CSG).

Figure 14:
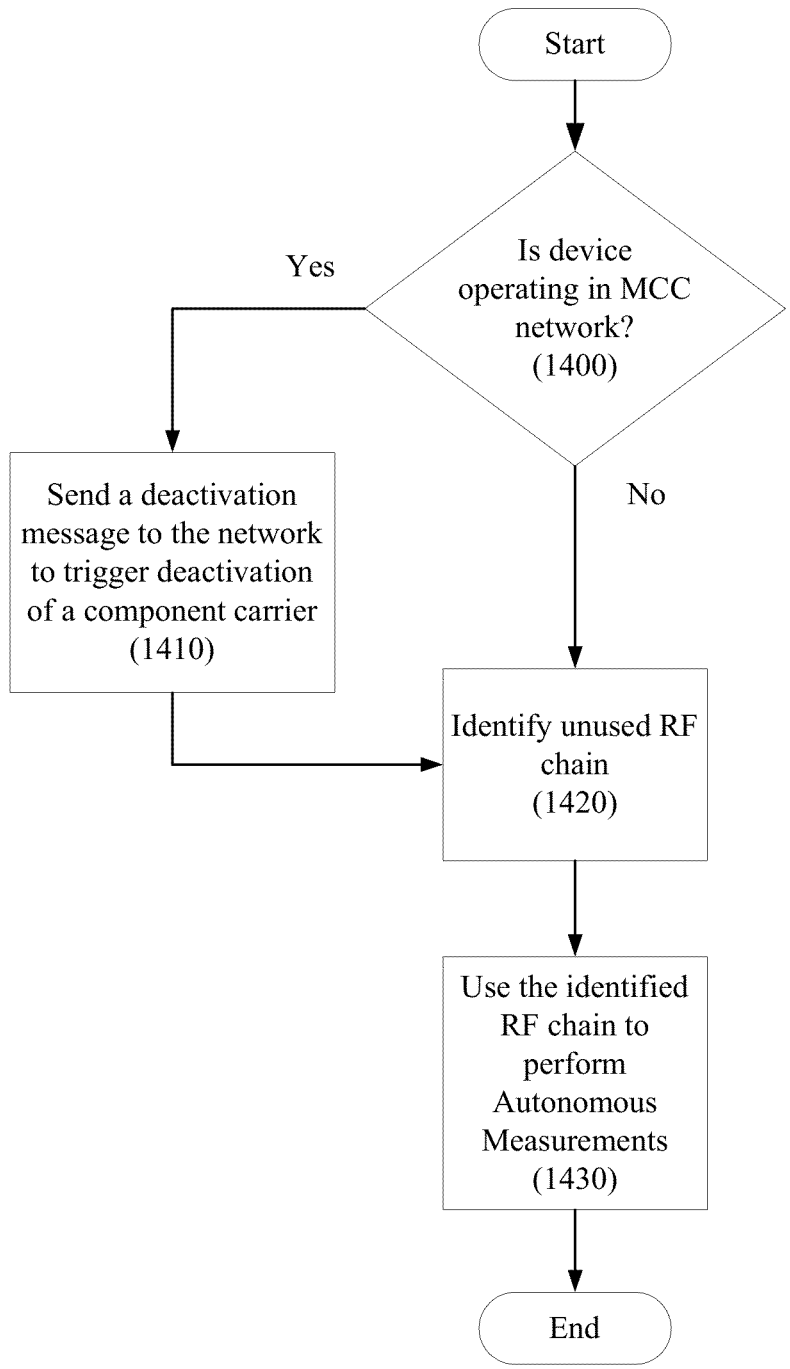
FIG. 14 illustrates a flow chart according to another example method for repurposing an RF chain to perform an autonomous measurement in accordance with some example embodiments.

FIG. 14 illustrates a flow chart according to another example method for repurposing an RF chain to perform an autonomous measurement in accordance with some example embodiments. In this regard, FIG. 14 illustrates a method that can be performed by a carrier aggregation capable wireless communication device, such as wireless communication device 302, in accordance with some example embodiments. One or more of processing circuitry 410, processor 412, memory 414, transceiver(s) 416, or RF chain controller 418 can, for example, provide means for performing the operations illustrated in and described with respect to FIG. 14.

Operation 1400 can include the wireless communication device 302 determining whether the device is operating in a MCC network. If it is determined in operation 1400 that the wireless communication device 302 is operating in a MCC network, then the method can proceed to operation 1410, in which the wireless communication device 302 can send a deactivation message to the network to trigger deactivation of a component carrier to free an RF chain for repurposing. If, however, it is determined at operation 1400 that the wireless communication device 302 is not operating in an MCC network, then the device can already have an unused RF chain, and operation 1410 can be omitted. In operation 1420, the wireless communication device 302 can identify an unused RF chain. The identified RF chain can be the RF chain released in response to the deactivation message sent in operation 1410, or an available RF chain that can result from operating a carrier aggregation capable wireless communication device in a non MCC network.

Operation 1430 can include the wireless communication device 302 repurposing the identified RF chain by using the identified RF chain to perform autonomous measurements. The autonomous measurements that can be performed in operation 1430 can, for example, be autonomous measurements of a home eNB or other CSG cell. Thus, for example, the autonomous measurements of operation 1430 can be used to (1) detect the presence of a home eNB or other CSG cell; (2) measure the receive signal level and quality of the CSG cell; and (3) detect system information of the CSG. Detection of the system information can, for example, include determining the cell ID and determining whether the wireless communication device 302 is authorized to register to the CSG cell (e.g., whether the device or user associated therewith is a member of the CSG).

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for managing radio frequency (RF) chains in a carrier aggregation capable wireless communication device, the method comprising the wireless communication device:
   using a first RF chain associated with a first component carrier and a second RF chain associated with a second component carrier to support a connection to a network implementing a carrier aggregation capable Long Term Evolution (LTE) technology;
   formatting a deactivation message configured to trigger deactivation of the second component carrier;
   sending the deactivation message to the network to trigger deactivation of the second component carrier;
   discontinuing usage of the second RF chain to support the connection to the network via the second component carrier after sending the deactivation message; and
   repurposing the second RF chain for a function other than communication via the second component carrier in support of the connection to the network while the first RF chain is used to support the connection to the network via the first component carrier,
   wherein:
   the formatting the deactivation message comprises formatting a media access control (MAC) control element (CE) comprising a deactivation indication for the second component carrier, and wherein the MAC CE includes a MAC packet data unit (PDU) with a reserved Logical Channel ID (LCID) designated for component carrier deactivation signaling, and
   the repurposing the second RF chain comprises using the second RF chain to scan for a home public land mobile network (HPLMN) associated with the wireless communication device, the HPLMN having a higher priority than the network, when the network comprises a public land mobile network (PLMN), other than the HPLMN, to which the wireless communication device is roaming, while the first RF chain is used to support the connection to the network via the first component carrier.

2. The method of claim 1, wherein the deactivation message comprises a deactivation request message and the wireless communication device waits for a response from the network comprising a deactivation permission response before discontinuing usage of the second RF chain.

3. The method of claim 1, wherein the repurposing the second RF chain further comprises using the second RF chain to scan for a paging message on a second network.

4. The method of claim 1, wherein the repurposing the second RF chain further comprises using the second RF chain to perform parallel measurement of a target cell.

5. The method of claim 4, further comprising the wireless communication device:
   determining whether a signal quality of the serving cell falls below a threshold signal quality; and wherein the sending the deactivation message to the network and the using the second RF chain to perform parallel measurement of the target cell are performed in response to the signal quality falling below the threshold signal quality.

6. The method of claim 1, wherein the repurposing the second RF chain further comprises using the second RF chain to perform an autonomous measurement of a target cell to acquire system information of the target cell.

7. The method of claim 6, wherein the target cell is a closed subscriber group (CSG) cell.

8. A method for repurposing a radio frequency (RF) chain in a carrier aggregation capable wireless communication device, the method comprising the wireless communication device:
   using a first RF chain to support a connection to a network;
   selecting a second RF chain to repurpose;
   determining whether an active secondary component carrier is associated with the second RF chain;
   in an instance in which it is determined that an active secondary component carrier is associated with the second RF chain:
      formatting a deactivation message comprising a media access control (MAC) control element (CE) comprising a deactivation indication for the active secondary component carrier, the MAC CE including a MAC packet data unit (PDU) with a reserved Logical Channel ID (LCID) designated for component carrier deactivation signaling, and
      sending the deactivation message to the network to trigger deactivation of the active secondary component carrier associated with the second RF chain prior to repurposing the second RF chain; and
   repurposing the second RF chain for a function other than communication via a secondary component carrier in support of the connection to the network,
   wherein the repurposing the second RF chain comprises using the second RF chain to scan for a home public land mobile network (HPLMN) associated with the wireless communication device, the HPLMN having a higher priority than the network, when the network comprises a public land mobile network (PLMN), other than the HPLMN, to which the wireless communication device is roaming, while the first RF chain is used to support the connection to the network via the first component carrier.

9. The method of claim 8, wherein the deactivation message comprises a deactivation request message and the wireless communication device waits for a response from the network comprising a deactivation permission response before repurposing the second RF chain.

10. The method of claim 8, wherein the determining whether an active secondary component carrier is associated with the RF chain comprises determining whether the network is a multiple component carrier capable (MCC) network, and wherein the sending the deactivation message comprises sending the deactivation message only in an instance in which it is determined that the network is an MCC network.

11. The method of claim 8, wherein the repurposing the second RF chain further comprises using the second RF chain to scan for a paging message on a second network while the first RF chain is used to support the connection to the network.

12. The method of claim 8, wherein the repurposing the second RF chain further comprises using the second RF chain to perform parallel measurement of a target cell.

13. The method of claim 12, wherein the using the second RF chain to perform parallel measurement of the target cell is performed in response to a signal quality of the serving cell of the network falling below a threshold signal quality.

14. The method of claim 8, wherein the repurposing the second RF chain further comprises using the second RF chain to perform an autonomous measurement of a target cell to acquire system information of the target cell.

15. The method of claim 14, wherein the target cell is a closed subscriber group (CSG) cell.

16. The method of claim 1, wherein the repurposing the second RF chain further comprises using the second RF chain to obtain frequency and timing information for synchronization between the wireless communication and a candidate cell before handoff to the candidate cell.

17. The method of claim 8, wherein the repurposing the second RF chain further comprises using the second RF chain to obtain frequency and timing information for synchronization between the wireless communication and a candidate cell before handoff to the candidate cell.

18. The method of claim 1, wherein the deactivation message comprises a deactivation notification message and the wireless communication device does not wait for a response from the network before discontinuing usage of the second RF chain.

19. The method of claim 8, wherein the deactivation message comprises a deactivation notification message and the wireless communication device does not wait for a response from the network before discontinuing usage of the second RF chain.

20. A wireless communication device comprising:
   a first radio frequency (RF) chain associated with a first component carrier;
   a second RF chain associated with a second component carrier; and
   processing circuitry configured to control the wireless communication device to at least:
      use the first RF chain and the second RF chain to support a connection to a network implementing a carrier aggregation capable Long Term Evolution (LTE) technology;
      format a deactivation message configured to trigger deactivation of the second component carrier;
      send the deactivation message to the network to trigger deactivation of the second component carrier;
      discontinue usage of the second RF chain to support the connection to the network via the second component carrier after sending the deactivation message; and
      repurpose the second RF chain for a function other than communication via the second component carrier in support of the connection to the network while the first RF chain is used to support the connection to the network via the first component carrier,
   wherein:
      the wireless communication device formats the deactivation message by formatting a media access control (MAC) control element (CE) comprising a deactivation indication for the second component carrier, and wherein the MAC CE includes a MAC packet data unit (PDU) with a reserved Logical Channel ID (LCID) designated for component carrier deactivation signaling, and
      the wireless communication device repurposes the second RF chain by using the second RF chain to scan for a home public land mobile network (HPLMN) associated with the wireless communication device, the HPLMN having a higher priority than the network, when the network comprises a public land mobile network (PLMN), other than the HPLMN, to which the wireless communication device is roaming, while the first RF chain is used to support the connection to the network via the first component carrier.

21. A wireless communication device comprising:

a first radio frequency (RF) chain associated with a first component carrier;

a second RF chain associated with a second component carrier; and processing circuitry configured to control the wireless communication device to at least:

use the first RF chain to support a connection to a network;

select the second RF chain to repurpose;

determine whether an active secondary component carrier is associated with the second RF chain;

in an instance in which it is determined that an active secondary component carrier is associated with the second RF chain:

format a deactivation message comprising a media access control (MAC) control element (CE) comprising a deactivation indication for the active secondary component carrier, the MAC CE including a MAC packet data unit (PDU) with a reserved Logical Channel ID (LCID) designated for component carrier deactivation signaling, and send the deactivation message to the network to trigger deactivation of the active secondary component carrier associated with the second RF chain prior to repurposing the second RF chain; and repurpose the second RF chain for a function other than communication via the secondary component carrier in support of the connection to the network, wherein the wireless communication device repurposes the second RF chain by using the second RF chain to scan for a home public land mobile network (HPLMN) associated with the wireless communication device, the HPLMN having a higher priority than the network, when the network comprises a public land mobile network (PLMN), other than the HPLMN, to which the wireless communication device is roaming, while the first RF chain is used to support the connection to the network via the first component carrier.

* * * * *